US010002271B2

United States Patent
Olmstead et al.

(10) Patent No.: US 10,002,271 B2
(45) Date of Patent: Jun. 19, 2018

(54) DATA READING SYSTEM AND METHOD FOR MULTI-VIEW IMAGING USING AN ADJUSTABLE MIRROR

(71) Applicant: Datalogic USA, Inc., Eugene, OR (US)

(72) Inventors: Bryan L. Olmstead, Eugene, OR (US); Alan Shearin, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days. days.

(21) Appl. No.: 14/531,589

(22) Filed: Nov. 3, 2014

(65) Prior Publication Data

US 2015/0122890 A1 May 7, 2015

Related U.S. Application Data

(60) Provisional application No. 61/899,756, filed on Nov. 4, 2013.

(51) Int. Cl.
*G06K 7/10* (2006.01)
*G07G 1/00* (2006.01)

(52) U.S. Cl.
CPC ..... *G06K 7/10603* (2013.01); *G06K 7/10831* (2013.01); *G06K 7/10871* (2013.01); *G07G 1/0045* (2013.01)

(58) Field of Classification Search
CPC ........... G06K 7/10693; G06K 7/10871; G06K 7/10831; G06K 7/10861; G06K 7/10603; G06K 7/10702
See application file for complete search history.

(56) References Cited

U.S. PATENT DOCUMENTS

| | | | |
|---|---|---|---|
| 4,939,355 A | 7/1990 | Rando et al. | |
| 5,019,694 A | 5/1991 | Collins | |
| 5,408,352 A * | 4/1995 | Peng | G06K 7/10871 235/462.38 |
| 5,486,944 A * | 1/1996 | Bard | G06F 1/163 235/462.36 |
| 5,495,097 A * | 2/1996 | Katz et al. | 235/462.12 |

(Continued)

FOREIGN PATENT DOCUMENTS

| | | |
|---|---|---|
| JP | 11-203423 A | 7/1999 |
| JP | 2002-029608 A | 1/2002 |

OTHER PUBLICATIONS

SCDigest.com article, RFID and AIDC News: "New Kroger Bar Code Scan Tunnel . . . " Jan. 11, 2011 http://www.scdigest.com/ontarget/11-01-11-2.php?cid=4083 Visited Jan. 25, 2011.

(Continued)

*Primary Examiner* — Christopher Stanford
(74) *Attorney, Agent, or Firm* — Stoel Rives LLP

(57) ABSTRACT

An automated checkout system for data reading, and related methods of use, the checkout system including a portal scanner and a conveyor for transporting items, the portal scanner housing a data reader with a view volume directed at a steerable mirror. In one example, the steerable mirror moves between various positions to augment the effective view volume of the data reader for capturing data from various surfaces of the item being transported on the conveyor. The portal scanner may include one or more mirrors arranged in an angular configuration to redirect the view volume of the data reader to capture data from the various surfaces of the item.

19 Claims, 16 Drawing Sheets

(56) References Cited

U.S. PATENT DOCUMENTS

| | | | |
|---|---|---|---|
| 5,572,008 A * | 11/1996 | Sakai | G06K 7/10702 235/462.4 |
| 5,770,848 A * | 6/1998 | Oizumi | G06K 7/10831 235/383 |
| 5,844,222 A * | 12/1998 | Ackley | G06K 7/14 235/454 |
| 5,912,447 A * | 6/1999 | Bjorner et al. | 235/454 |
| 5,979,761 A * | 11/1999 | Wurz | G06K 7/10702 235/454 |
| 6,053,409 A * | 4/2000 | Brobst et al. | 235/462.36 |
| 6,189,784 B1 | 2/2001 | Williams et al. | |
| 6,330,973 B1 | 12/2001 | Bridgelall et al. | |
| 6,446,870 B1 | 9/2002 | Rando | |
| 6,484,066 B1 | 11/2002 | Riess et al. | |
| 6,588,669 B1 * | 7/2003 | Claus | G06K 7/10613 235/383 |
| 6,837,428 B2 | 1/2005 | Lee et al. | |
| 6,837,587 B1 | 1/2005 | Hughes et al. | |
| 6,856,437 B2 | 2/2005 | Witt et al. | |
| 6,899,272 B2 | 5/2005 | Krichever | |
| 7,000,839 B2 | 2/2006 | Good et al. | |
| 7,044,370 B2 | 5/2006 | Bellis, Jr. et al. | |
| 7,051,940 B2 | 5/2006 | Tamburrini et al. | |
| 7,325,729 B2 | 2/2008 | Crockett et al. | |
| 7,398,927 B2 | 7/2008 | Olmstead | |
| 7,527,205 B2 | 5/2009 | Zhu et al. | |
| 7,600,689 B2 | 10/2009 | Tsikos et al. | |
| 7,720,194 B2 | 5/2010 | Connelly et al. | |
| D668,656 S | 10/2012 | Hoskinson et al. | |
| 8,322,621 B2 | 12/2012 | Olmstead et al. | |
| 8,668,150 B2 * | 3/2014 | Bombaugh et al. | 235/462.32 |
| 2005/0230477 A1 | 10/2005 | Tsikos et al. | |
| 2006/0022051 A1 * | 2/2006 | Patel et al. | 235/462.14 |
| 2006/0261157 A1 | 11/2006 | Ostrowski et al. | |
| 2007/0181685 A1 * | 8/2007 | Zhu et al. | 235/454 |
| 2009/0134221 A1 | 5/2009 | Xiaoxun et al. | |
| 2010/0163626 A1 | 7/2010 | Olmstead | |
| 2010/0163627 A1 | 7/2010 | Olmstead | |
| 2010/0163628 A1 | 7/2010 | Olmstead | |
| 2010/0217678 A1 | 8/2010 | Goncalves | |
| 2011/0248083 A1 * | 10/2011 | Bonner | G06F 17/30 235/375 |
| 2012/0127551 A1 | 5/2012 | Eto et al. | |
| 2012/0205448 A1 | 8/2012 | Hoskinson et al. | |
| 2012/0261473 A1 | 10/2012 | Bombaugh et al. | |
| 2013/0020391 A1 | 1/2013 | Olmstead et al. | |
| 2013/0020392 A1 | 1/2013 | Olmstead et al. | |
| 2013/0200157 A1 * | 8/2013 | Nunnink | G06K 7/1491 235/462.22 |

OTHER PUBLICATIONS

PCT Application No. PCT/US2012/022438: International Search Report dated Sep. 5, 2012; Preliminary Report on Patentability dated Aug. 8, 2013.

Extended European Search Report for EP Patent Application No. 12 739 344.5 dated Sep. 19, 2014, 6 pages.

* cited by examiner

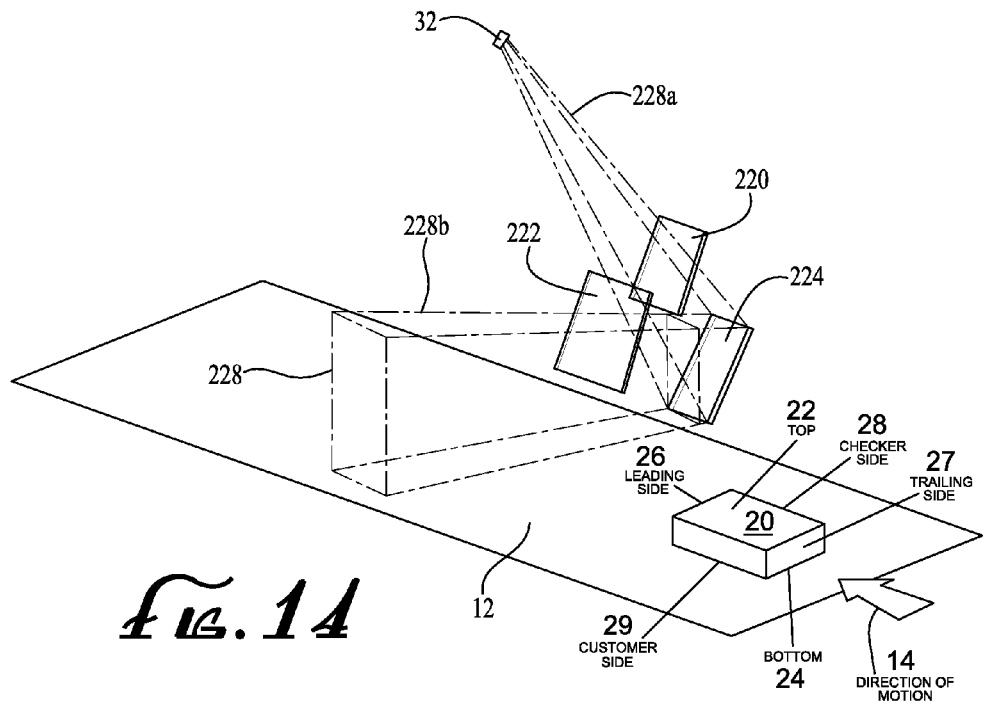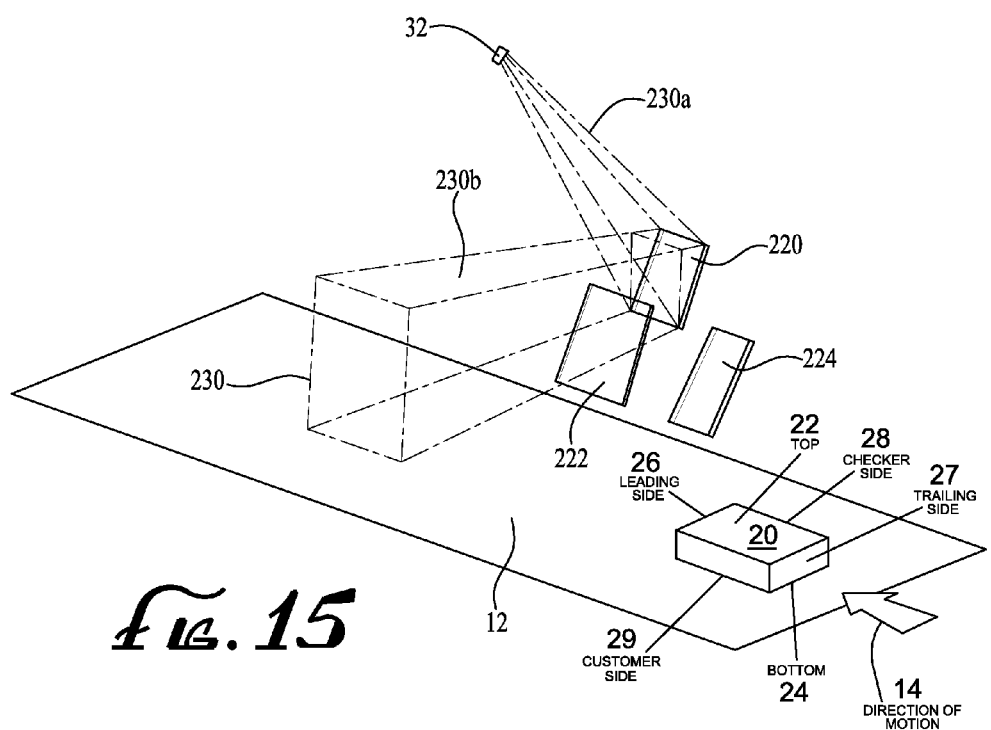

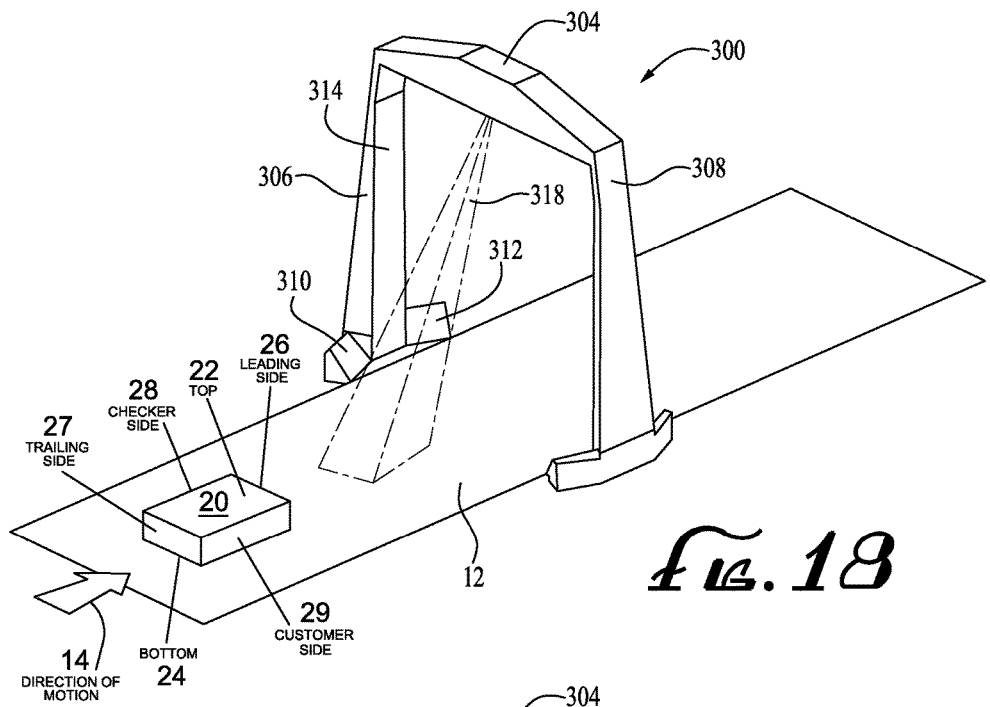
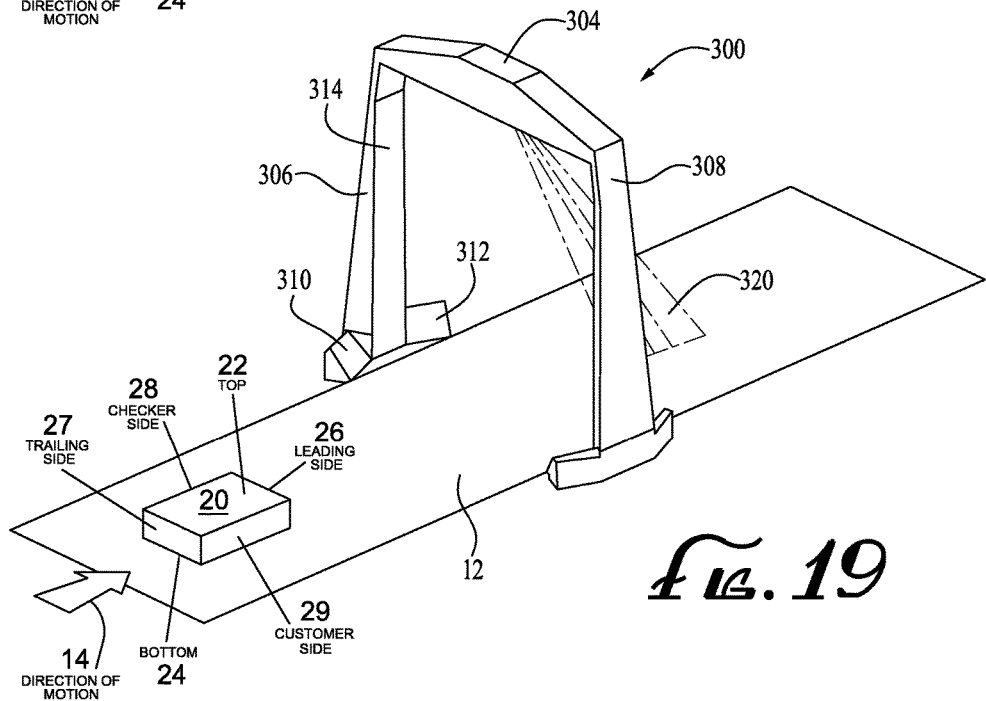

DATA READING SYSTEM AND METHOD FOR MULTI-VIEW IMAGING USING AN ADJUSTABLE MIRROR

RELATED APPLICATION DATA

This application is a nonprovisional of and claims priority under 35 U.S.C. § 119(e) to U.S. Provisional Application No. 61/899,756, filed on Nov. 4, 2013, the disclosure of which is hereby incorporated by reference.

BACKGROUND

The field of this disclosure relates generally to data reading systems, and more particularly to automated data reading systems where items are transported through a read zone of one or more data readers at which the items are identified by reading optical codes, RFID (radio frequency identification) tags, or other identifiers carried by the items.

Data reading systems are used to read optical codes, acquire data, and/or capture images to identify an item. Data reading devices are well known for reading UPC and other types of optical codes on packages, particularly in retail stores. One common data reader in such systems is an imaging reader that employs an imaging device or sensor array, such as a COD (charge coupled device) or CMOS (complementary metal oxide semiconductor) device. Imaging readers can be configured to read both 1-D and 2-D optical codes, as well as other types of optical codes or symbols and capture images of other items. When an imaging reader is used to read an optical code, an image of the optical code or portion thereof is focused onto a detector array. Though some imaging readers are capable of using ambient light illumination, an imaging reader typically utilizes a light source to illuminate the item being read to provide the required signal response in the imaging device.

An imager-based reader utilizes a camera or imager to generate electronic image data, typically in digital form, of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner. It should be noted that a camera is typically a combination of a lens and an imaging device/sensor array, but the terms imager and camera may be used interchangeably herein.

Imager-based readers often can only form images from one perspective, usually that of a normal vector out of the face of the imager. Such imager-based readers therefore provide only a single point of view, which may limit the ability of the reader to recognize an optical code in certain circumstances. For instance, because the scan or view volume of an imager in an imager-based reader is typically conical in shape, attempting to read an optical code (e.g., a barcode) or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles. In addition, labels oriented at extreme acute angles relative to the imager may not be readable. Lastly, the label may be oriented on the opposite side of the package with respect to the camera view, causing the package to obstruct the camera from viewing the barcode.

Thus, better performance could result from taking images from multiple perspectives. Imager-based readers that generate multiple perspectives are known. For example, one such reader is disclosed in U.S. Pat. No. 7,398,927, which describes an embodiment having two cameras to collect two images from two different perspectives for the purpose of mitigating specular reflection. In another example, U.S. Pat. No. 6,899,272 discloses a data reader that utilizes two independent sensor arrays pointed in different directions to collect image data from different sides of a package.

In some instances, scanning systems tend to use high-resolution, global shutter imagers/cameras to cover a wide field of view with high resolution. Such global shutter imagers tend to be expensive and increase the overall cost of the scanning system. In addition, in some multiple-camera imager-based readers, the system may require as many as ten, twelve, or even twenty individual cameras/imagers to adequately capture images from multiple perspectives. Each of these cameras/imagers typically requires illumination sources, circuit board(s), mounting hardware, and space for associated optical components. Such features and components typically increase the expense, complicate the physical design, and increase the overall size and bulk of the data reading system. The present inventors have, therefore, determined that it would be desirable to provide a data reading system with improved performance features and optical design configurations to minimize the number of individual cameras required to adequately capture multiple views of a target item, while maintaining a lean profile to minimize cost and size (e.g., bulk) of the data reading system.

Additional aspects and advantages will be apparent from the following detailed description of various example embodiments, which proceeds with reference to the accompanying drawings. Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIGS. 12-15 are simplified schematic views illustrating multiple image views of the camera system of FIGS. 9 and 10.

FIGS. 18-23 are simplified schematic views illustrating multiple image views of the dual-camera system of FIG. 17.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein can alternatively be used, for example, in an industrial location such as a parcel distribution center (e.g., postal), warehouse, or luggage distribution center. In addition, though the portal scanners 200, 300, 400 may be described in greater detail including data readers, each of the scanners 200, 300, 400 may alternately comprise an RFID reader, an image recognition reader, an optical code reader, or combinations thereof.

In addition, it should be understood that reference to a "data reader" in the specification is used in an expansive sense to describe a data reader that may include a camera/imager or other imaging system, a microprocessor, a decoding unit, and a controller for communicating data to other data readers or external systems. However, the term "data reader" is not intended to be limited to require each of these components. In some embodiments, a data reader may include a camera or other imaging system, and may not include a processor, decoding unit, and the controller. These components may be entirely external to the data reader itself, such as being a part an external system with which the data reader communicates. For example, the data reader may be a camera that obtains images of the item and communicates or transmits those images to an external database for decoding and processing. While it is generally understood that a camera is typically a combination of a lens and an imaging device or sensor array, the terms imager (or imaging system) and camera may be used interchangeably herein.

Figure 11:
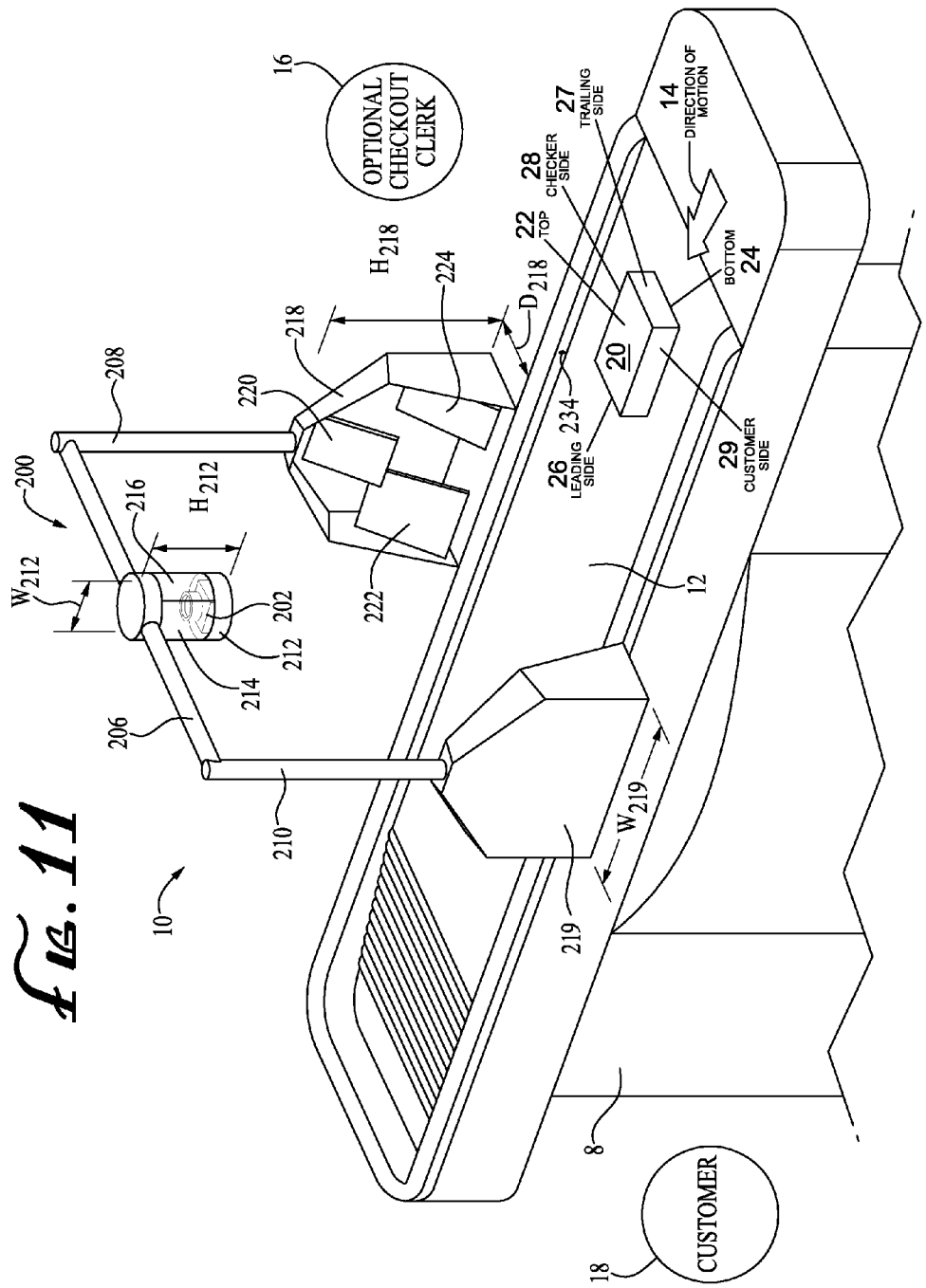
FIG. 11 is a simplified schematic view of a portal scanner with the camera system of FIGS. 9 and 10 for generating multiple image views of an item transported through the scanner, according to one embodiment.

FIG. 11 illustrates a simplified embodiment of an automated checkout system 10 that may be used to read and process an optical code (e.g., a barcode label) or capture other target data (RFID tags, images, etc.) from various surfaces of an item 20 during a checkout process, such as in a retail establishment or supermarket. The automated checkout system 10 includes a scanner 200 and a conveyor 12 for transporting items 20 through a read region of the scanner 200. It should be understood that although the transport systems are generally described with respect to a belt-type conveyor, other conveyor/transport systems may be employed such as: inclined slides, vibratory conveyors, roller conveyors, turntables, blower systems (the items driven along a surface via a blower), combinations thereof, or other suitable transport systems.

In an example reading process, a user, such as a checkout clerk 16 or customer 18, places the item 20 onto the conveyor 12. The conveyor 12 transports the item 20 in a substantially linear direction of motion 14 toward a read region of the scanner 200. Generally, the read region is defined by the collective views of the data readers/cameras of the scanner 200 (see for example FIGS. 12-15 or FIG. 24) and includes the inner space or enclosed area within the boundaries of the scanner 200. In some embodiments, the read region may extend outside (e.g., in front of and/or behind) the footprint of the scanner 200 depending on the angular orientation of the views of the data readers/cameras (as is further described in detail below).

As the item 20 moves through the read region, a data reader 202 of the scanner 200 operates in conjunction with a movable fast steering mirror 30 (see FIGS. 9-10) to capture various images of the item 20 from multiple perspectives. Once the images are captured, they are then processed to decode the barcode label or other data captured in the image. After passing through the read region of the scanner 200, the item 20 is transported on the conveyor 12 to a bagging area or other section where the user or other person can bag or box the item 20 for removal.

The automated checkout system 10 may be installed at a checkstand or other counter structure 8 (see FIG. 11) that may be used at a high-volume retail establishment, such as a grocery store or big-box store. In some embodiments, the conveyor 12 may be divided into an input conveyor section and an exit conveyor section spaced apart from each other by a gap. In such embodiments, the automated checkout system 10 may include a bottom data reader positioned beneath the conveyors and configured to read upwardly through the gap to capture data from a bottom surface of the item 20. Additional details and example embodiments for such automated checkout systems are described in U.S. App. Pub. Nos. 201210187195 and 201310020392, the disclosures of which are incorporated by reference herein.

For general purposes of discussion, the item 20 is represented as a six-sided, box-shaped package. In some instances, the item 20 may be described with respect to its direction of motion 14 on the conveyor 12. In addition, item 20 may be described relative to the position of a checkout clerk 16 and a customer 18. This convention is meant to facilitate description and establish a frame of reference related to a typical position of the checkout clerk 16 and the customer 18, as illustrated in FIG. 11, and is not intended to be limiting. For instance, the item 20 may be described as having a top side 22, a bottom side 24, and four lateral sides 26, 27, 28, and 29. The lateral sides may be referred to as the leading (or front lateral) side 26 (the side leading the object as it is passed through the read region), the trailing (or rear lateral) side 27 (the trailing side of the object as it is passed through the read region), the checker (or right lateral) side 28 (due to its proximity to a checkout clerk 16), and the customer (or left lateral) side 29 (due to its proximity to a customer 18).

It should be understood that the automated checkout stand 10 may be used without a checkout clerk 16, and/or the customer 18 or clerk 16 may be positioned at any side of the automated checkout stand 10. In addition, the item 20 is described as a box-shaped package for convenience, but it should be understood that the item 20 may encompass other shapes, including, for example, round fruits or vegetables, cylindrical cans, irregularly shaped packages, such as a bag of potatoes, potato chips, or the like.

As briefly described previously, the fast steering mirror 30 is a steerable mirror that may be moved between various angles and positions to increase a view volume or field-of-view of the camera/data reader 202 for capturing multiple images of the item 20 from various perspectives. By using a fast steering mirror 30, the automated checkout system 10 may reduce the number of data readers/cameras 202 needed to capture various perspective views of an item 20. In some arrangements, the automated checkout system 10 may use only a single camera/data reader 202, in conjunction with the fast steering mirror 30, to cover a range of perspectives that prior systems may have covered using ten, twelve, or as many as twenty cameras/data readers. With reference to FIGS. 1-8, the following section proceeds with a detailed description of embodiments for the fast steering mirror 30 (or 80) of the automated checkout system 10.

Figure 1:
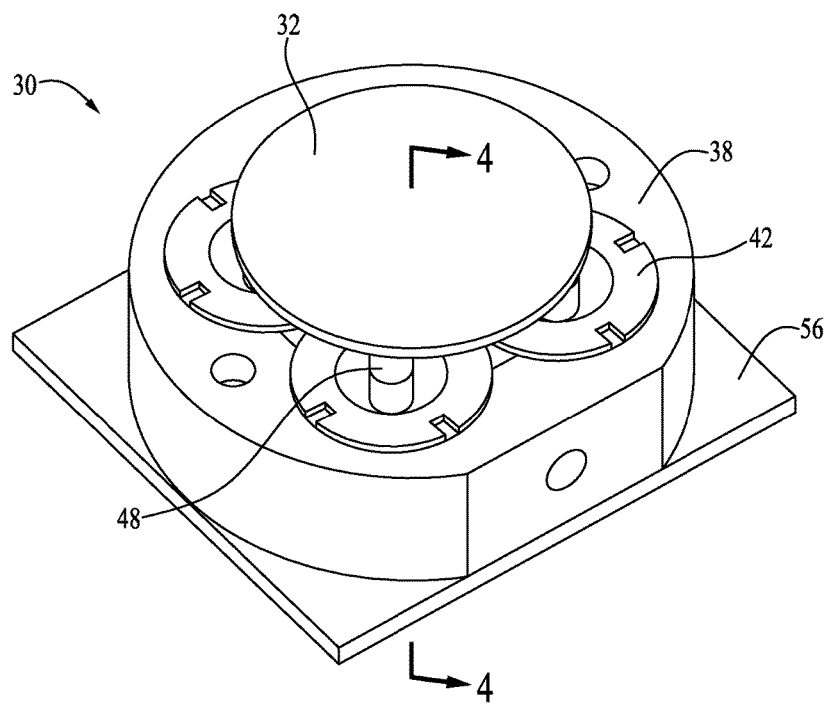
FIGS. 1 and 2 are isometric views of a fast steering mirror, according to one embodiment.
Figure 2:
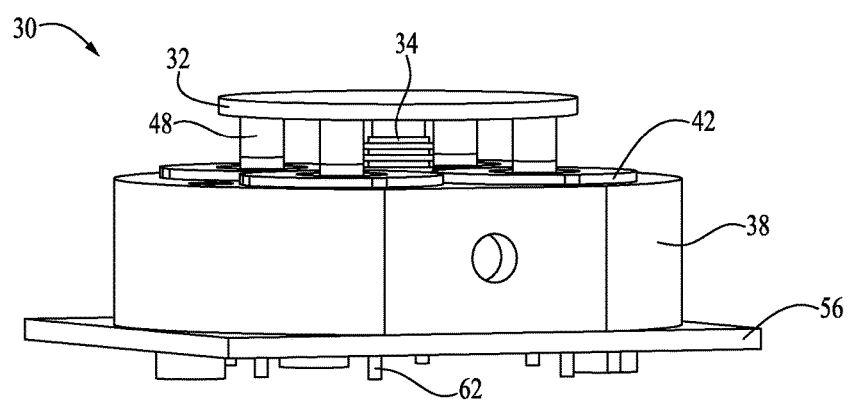

With general reference to FIGS. 1-2, the fast steering mirror 30 includes a mirror 32 supported by an elastomeric flexure 34 that allows the mirror 32 to pivot about two axes (e.g., an X- and Y-axis in the plane of the mirror surface), while constraining translational motion of the mirror 32 in a longitudinal direction (e.g., upward/downward movement of the mirror). An actuator system 36 (such as voice coils 42 and magnets 48) drives movement of the flexure 34 to pivot the fast steering mirror 30 about the X and Y axes as desired. A chassis 38 houses the actuator 36 and serves as a support/housing for the flexure 34 and other components of the fast steering mirror 30. Additional details of the components of the fast steering mirror 30 and their assembly are described in more detail in the following section.

Figure 3:
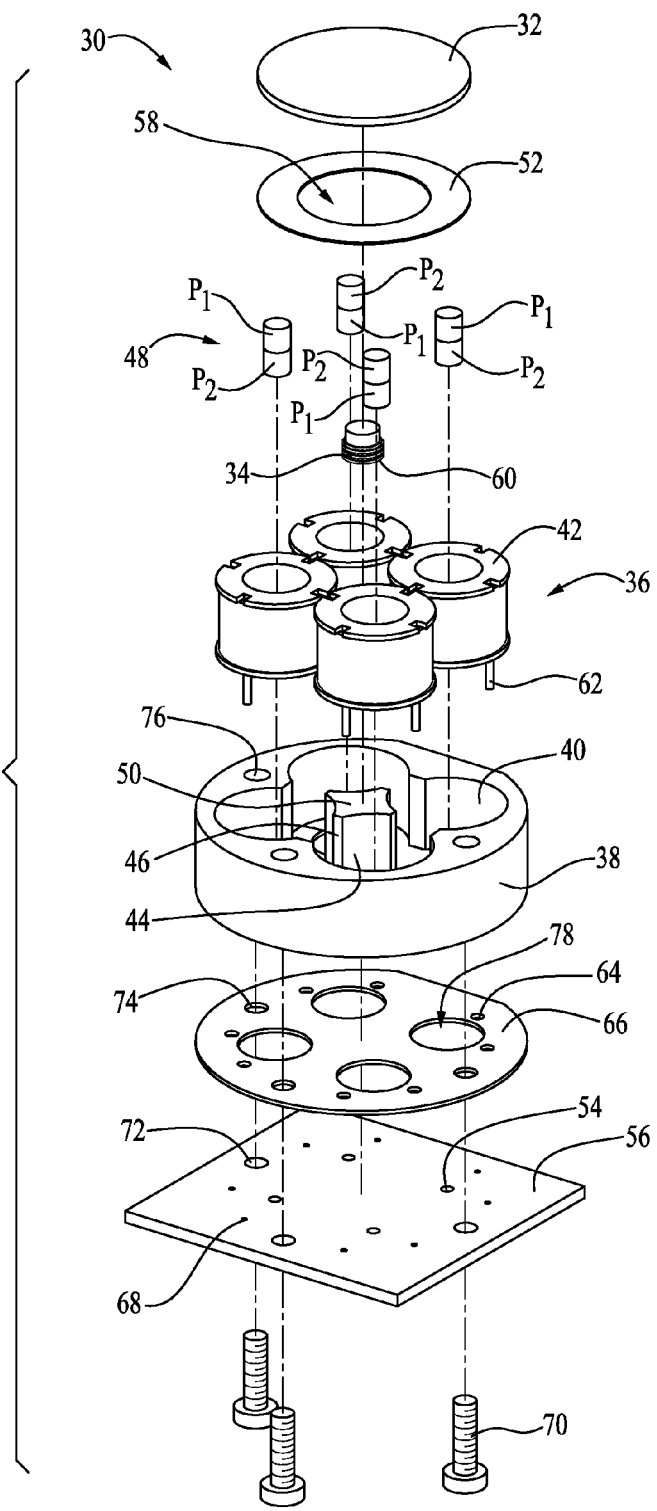
FIG. 3 is an exploded view of the fast steering mirror of FIGS. 1 and 2.

With particular reference to the exploded view of the fast steering mirror 30 illustrated in FIG. 3, the chassis 38 includes internal pockets 40 sized to receive and group the voice coils 42, with each one of the voice coils 42 seated in a corresponding one of the pockets 40. The chassis 38 further includes a central core 44 having a plurality of fins 46 radiating from the core 44 to physically separate the coils 42 from one another and to help retain the voice coils 42 in proper alignment within the chassis 38. The voice coils 42 are arrange to operate in a conventional push-pull configuration using magnets 48, with adjacent pairs of voice coils 42 having magnets 48 with opposite magnet polarities (noted in the figures as $P_1$, $P_2$). Magnets 48 for a first axis (such as the X-axis) are mounted in the same magnet polarity and at an opposite magnet polarity of a second axis (such as the Y-axis). In this push-pull configuration, the voice coils 42 for a given axis (such as the X-axis) are driven with opposite magnet polarity to push one of the magnets 48 and pull the other of the magnets 48. This configuration provides double the force over a single magnet/voice coil configuration and helps to create steady rotation of the mirror 32 about the flexure 34, while minimizing or inhibiting undesirable translational motion. The magnets 48 are positioned, and may be centered, within the voice coils 42 (see FIG. 4). In other embodiments, the magnets 48 may instead all be arranged in the same magnet polarity relative to one another (see FIG. 6).

With reference to FIG. 3, the fast steering mirror 30 includes an annular steel shim 52 attached to an underside of the mirror 32 and onto which the magnets 48 are attached. The shim 52 increases the magnetic field strength of the magnets 48 and prevents the field from projecting above/beyond the magnetic surface. As mentioned briefly, the magnets 48 are mounted in the same polarity for a given axis, which allows the shim 52 to increase the flux density of the magnets 48 in the radial direction, which is the portion of the flux density that provides force in the voice coils 42.

Position feedback of the fast steering mirror 30 is generated by sensing the magnetic flux density under each of the voice coils 42 using Hall sensors 54 mounted to a printed circuit board (PCB) 56. Each one of the Hall sensors 54 is positioned on the PCB 56 underneath a corresponding one of the voice coils 42 and centered under each one of the magnets 48. Accordingly, one Hall sensor 54 is associated with each of the voice coils 42 to sense the flux density for each of the voice coils 42. For a given axis with a pair of voice coils, the signals from each of the Hall sensors 54 associated with each voice coil pair are subtracted to eliminate undesirable effects, such as offset and temperature effects of the Hall sensor 54. This differential measurement also eliminates the static magnetic flux density bias when the fast steering mirror 30 is at a rest or baseline position. Another undesired signal to null out is the signal in the Hall sensors 54 derived from the coil current of the voice coils 42. Since the signal is proportional to the coil current of the voice coils 42, the signal can be subtracted by the measured Hall sensor signal to obtain the magnet motion signal.

Figure 4:
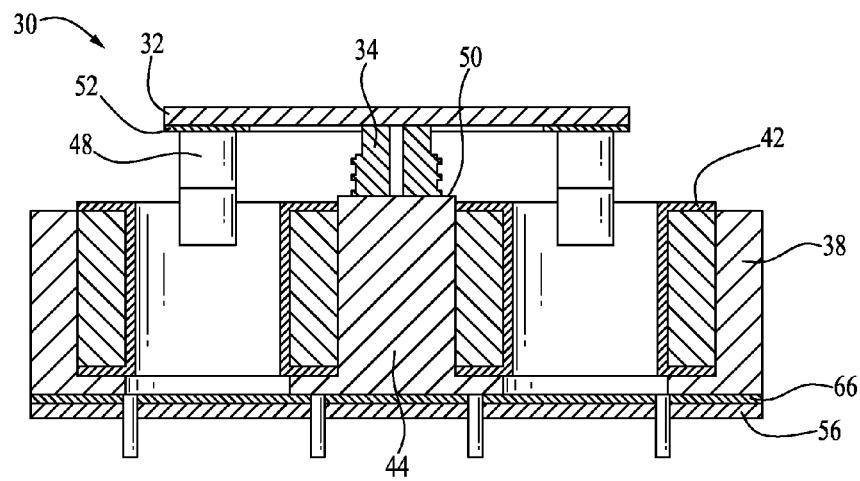
FIG. 4 is a cross-section view of the fast steering mirror of FIG. 1 taken along section 4-4.

With particular reference to the exploded view in FIG. 3 and the cross sectional view in FIG. 4, the following section describes an example assembly and arrangement of the components of the fast steering mirror 30. It should be understood that a specific assembly order described explicitly or implicitly herein is for illustration purposes and represents one embodiment of the assembly process. In other embodiments, the fast steering mirror 30 may be assembled in any other suitable order.

With reference to FIGS. 3 and 4, the steel shim 52 is adhered using glue or other adhesive substance, or otherwise attached to an underside of the mirror 32, and the magnets 48 are attached to the steel shim 52 in pairs of opposite polarities as described previously. Thereafter, the elastomeric flexure 34 is glued or otherwise attached to the mirror 32 within an opening 58 of the annular shim 52. The flexure 34 supports the mirror 32 on the chassis 38, with a bottom portion 60 of the flexure 32 resting against and attached on a planar top surface 50 of the central core 44. The magnets 48 are each paired with and rest in an opening of a corresponding voice coil 42. The voice coils 42 are grouped together by the chassis 38, with each of the voice coils 42 seated in a corresponding pocket 40 of the chassis 38.

As illustrated in FIG. 3, the voice coils 42 each have pins 62 extending downwardly therefrom. When the fast steering mirror 30 is assembled, the pins 62 are aligned with corresponding apertures 64, 68 on an insulator disc 66 and the PCB 56, respectively. The insulator disc 66 and PCB 56 are attached to the chassis 38 via fasteners 70. The fasteners 70 are inserted through mounting apertures 72, 74 on the PCB 56 and insulator disc 66, respectively, and through mounting apertures 76 on the chassis 38. When assembled, openings 78 of the insulator disc 66 surround the Hall sensors 54 positioned on the PCB 56 to help isolate the Hall sensors 54 from outside noise.

FIGS. 5-8 illustrate another embodiment of a fast steering mirror 80. Similar to the embodiment of the fast steering mirror 30 described with reference to FIGS. 1-4, the fast steering mirror 80 includes a mirror 82 supported by an elastomeric flexure 84 that allows the mirror 82 to pivot about two axes (e.g., an X- and Y-axis in the plane of the mirror surface), while constraining translational motion of the mirror 82 in a longitudinal direction. An actuator system 86 (e.g., voice coils 104 and magnets 106) drives movement of the flexure 84 to pivot the fast steering mirror 80 about the X and Y axes as desired. A chassis 88 houses the actuator system 86 and serves as a support/housing for the flexure 84 and other components of the fast steering mirror 80.

It should be understood that the fast steering mirror 80 may include several components with the same or similar functionality as previously described with respect to corresponding components of the fast steering mirror 30. Accordingly, to avoid repetition, such components of fast steering mirror 80 will not be further described in detail with the understanding that like components have similar features and serve similar functions in both embodiments unless otherwise described. The following describes additional details of the components of the fast steering mirror 80.

Figure 5:
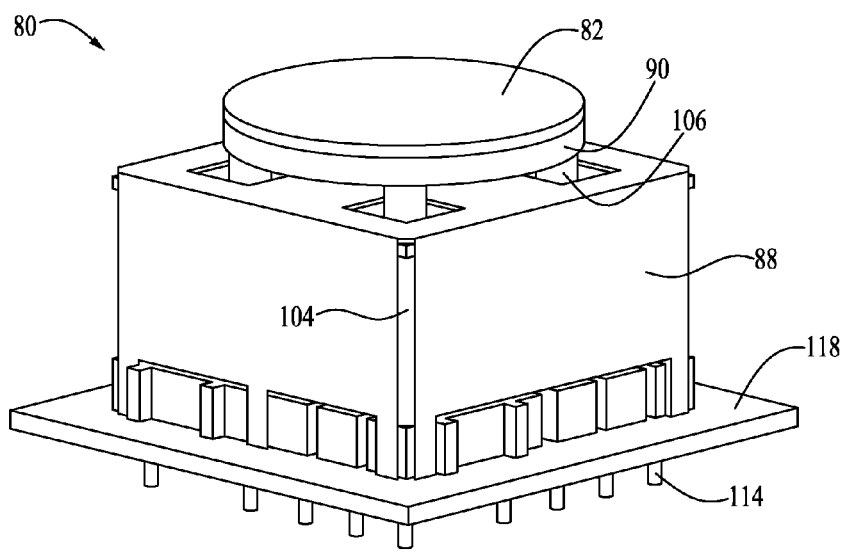
FIG. 5 is an isometric view of a fast steering mirror, according to another embodiment.
Figure 6:
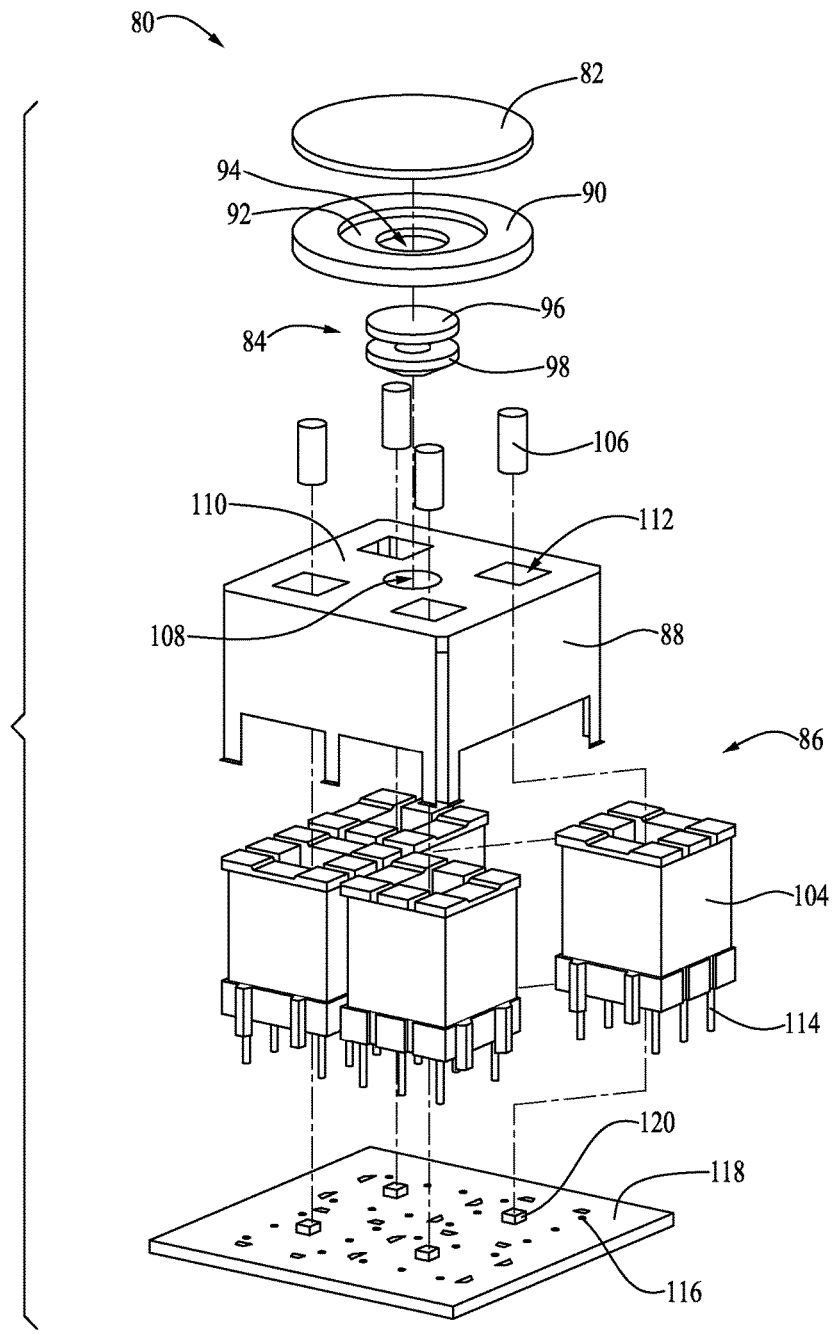
FIG. 6 is an exploded view of the fast steering mirror of FIG. 5.
Figure 7:
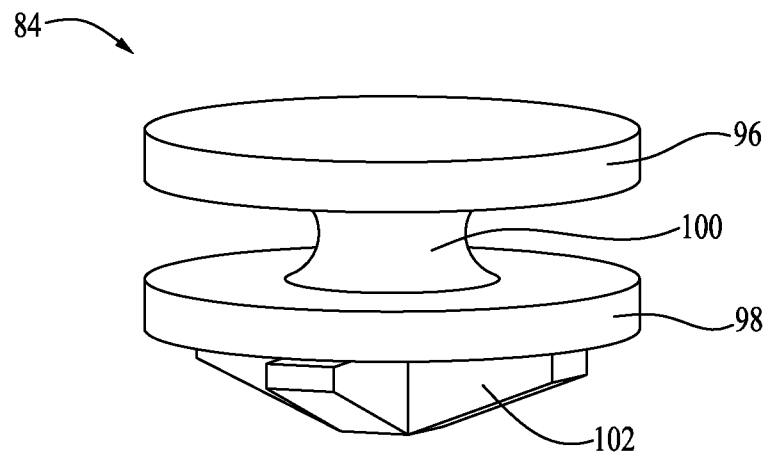
FIG. 7 is an isometric view of a flexure of the fast steering mirror of FIG. 5.
Figure 8:
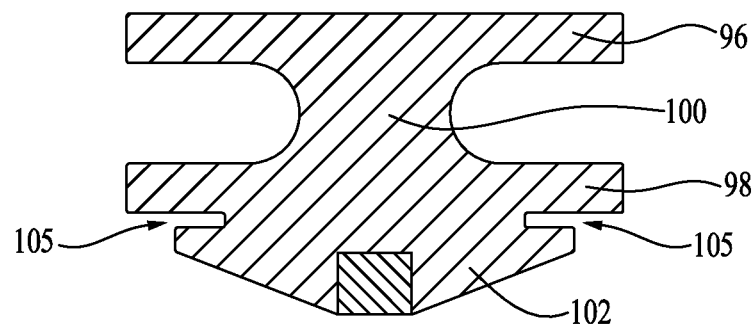
FIG. 8 is a cross-section view of the flexure of FIG. 7.

With particular reference to FIGS. 5 and 6, the fast steering mirror 80 includes a keeper 90 having a recessed surface 92 and a central opening 94 for receiving the flexure 84. The keeper 90 is preferably manufactured from a plastic material, but may also be made of metal (e.g., steel, aluminum, etc.) or other suitable material. With particular reference to FIGS. 7 and 8, the flexure 84 has an upper shoulder 96 and a lower shoulder 98 spaced apart by a neck portion 100 therebetween. The lower shoulder 98 includes a generally V-shaped anchor 102 having a pair of slits 105 that may help retain the flexure 84 within the chassis 88 as described in more detail below. The neck portion 100 supports the upper shoulder 96 and has a width that is narrower than the upper shoulder 96 to allow pivoting movement of the upper shoulder 96, which allows the fast steering mirror 80 to pivot about the flexure 84 in two dimensions (X and Y axes).

Turning back to FIG. 6, similar to the fast steering mirror 30 of FIGS. 3-4, the fast steering mirror 80 is driven by an actuator system 86 including a plurality of voice coils 104 and magnets 106 arranged with the same magnet polarity. The coils 104 drive the fast steering mirror 80 in a similar push-pull configuration described previously with respect to the fast steering mirror 30. The voice coils 104 and magnets 106 are housed inside the chassis 88. Preferably, the chassis 88 is made from sheet metal (or other suitable material) that provides heat dissipation due to contact with the voice coils 104. The chassis 88 includes an aperture 108 on a top surface 110 sized for receiving the anchor 102 of the flexure 84. In some embodiments, the anchor 102 may be snapped into and pushed through the aperture 108 until the lower shoulder 94 rests against the top surface 110 of the chassis 88. The slits 105 in the anchor 102 help retain the anchor 102 in position within the aperture 108. In some embodiments, an adhesive (e.g., glue) may be used to secure the flexure 84 against the chassis 88 if desired.

With particular reference to the exploded view in FIG. 6, the following section describes an example assembly and arrangement of the components of the fast steering mirror 80. It should be understood that any assembly order described explicitly or implicitly herein is for illustration purposes only and not intended as limiting. In other embodiments, the fast steering mirror 80 may be assembled in a different order.

With reference to FIG. 6, the upper shoulder 96 of the flexure 84 is inserted through the central opening 94 of the keeper 90 and pushed through until a bottom portion of the upper shoulder 96 rests against the recessed surface 92 of the keeper 90. The keeper 90 and the flexure 84 are then adhered or otherwise attached to the underside of the mirror 82 and the magnets 106 are attached to the keeper 90. The flexure 84 (with the mirror 82 and keeper 90) is mounted on the chassis 88 by inserting the anchor 102 of the flexure 84 through the aperture 108 on the top surface 110 of the chassis 88, with the slits 105 of the anchor 102 retaining the flexure 84 in position as previously described. The top surface 110 of the chassis 88 includes apertures 112 for receiving the magnets 106 therein.

As described previously, the chassis 88 houses the voice coils 104 with the pins 114 of the voice coils 104 extending downwardly therefrom. The pins 114 are inserted into corresponding openings 116 on a PCB 118. The PCB 118 includes Hall sensors 120 positioned thereon and arranged so that each one of the Hall sensors 120 is underneath a corresponding one of the voice coils 104 and centered under each one of the magnets 106 in a similar configuration as described with respect to fast steering mirror 30. The fast steering mirror 80 may use the same position feedback operation as described with respect to fast steering mirror 30.

With reference to FIGS. 9-27, the following description relates to example embodiments of the automated checkout system 10 with a fast steering mirror 30, 80 that automatically cycles through a number of rotations/positions to increase the effective view volume of a data reader 202. In some cases, the fast steering mirror 30, 80 allows the automated checkout system 10 to use only a single data reader 202 to capture multiple views of the item 20 as it moves through the read region of the scanner 200, as is further described below in detail. It should be understood that while FIGS. 9-27 and the associated written description may illustrate/refer to one particular embodiment of the fast steering mirror (such as fast steering mirror 30 or the fast steering mirror 80) either embodiment of the fast steering mirror 30 or 80 may be used. Accordingly, to avoid confusion and repetition, the following description references embodiments of the automated checkout system 10 having the fast steering mirror 30 with the understanding that the fast steering mirror 80 may alternatively be used in other embodiments.

Figure 9:
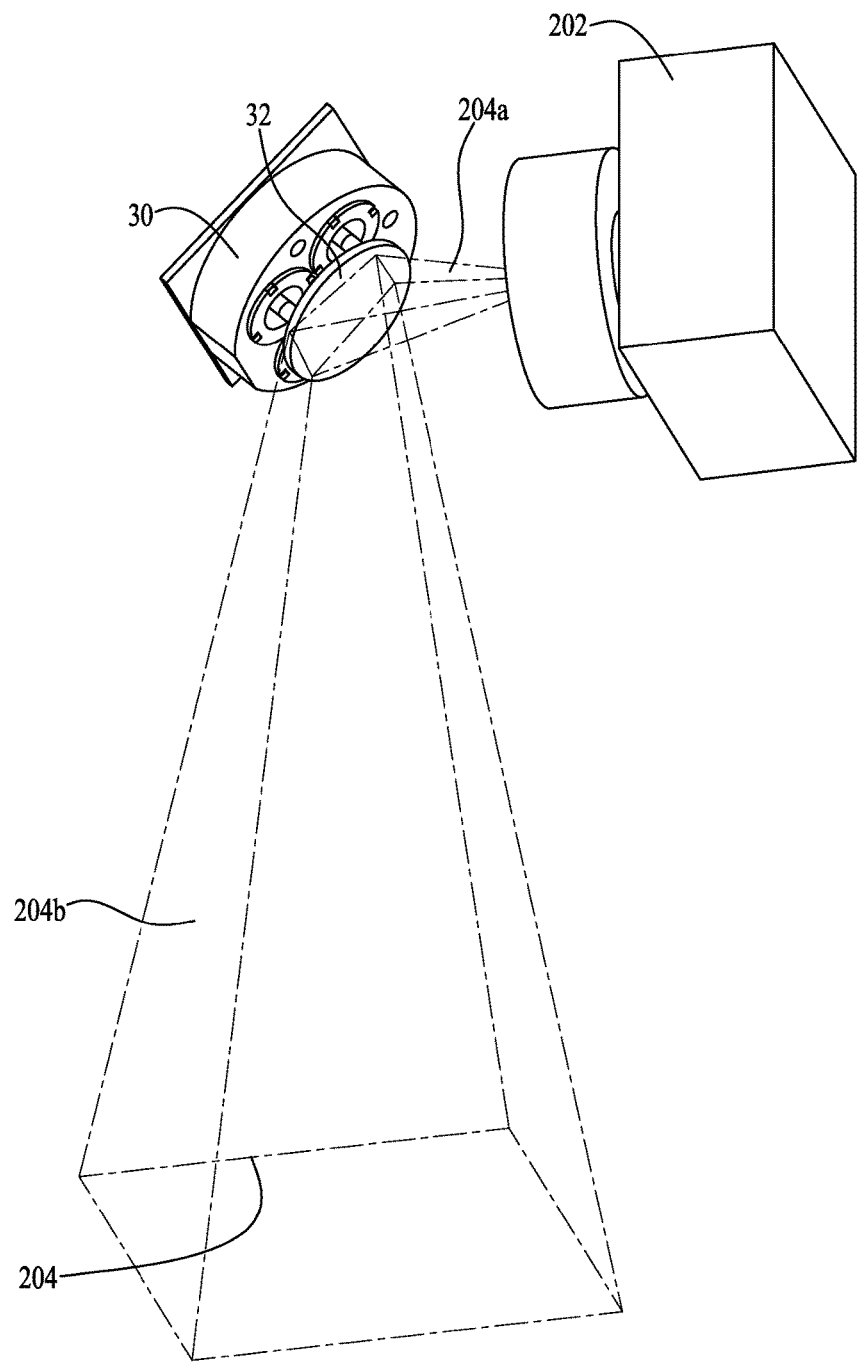
FIGS. 9 and 10 are schematic views of a camera system having a data reader and a fast steering mirror, according to one embodiment.
Figure 10:
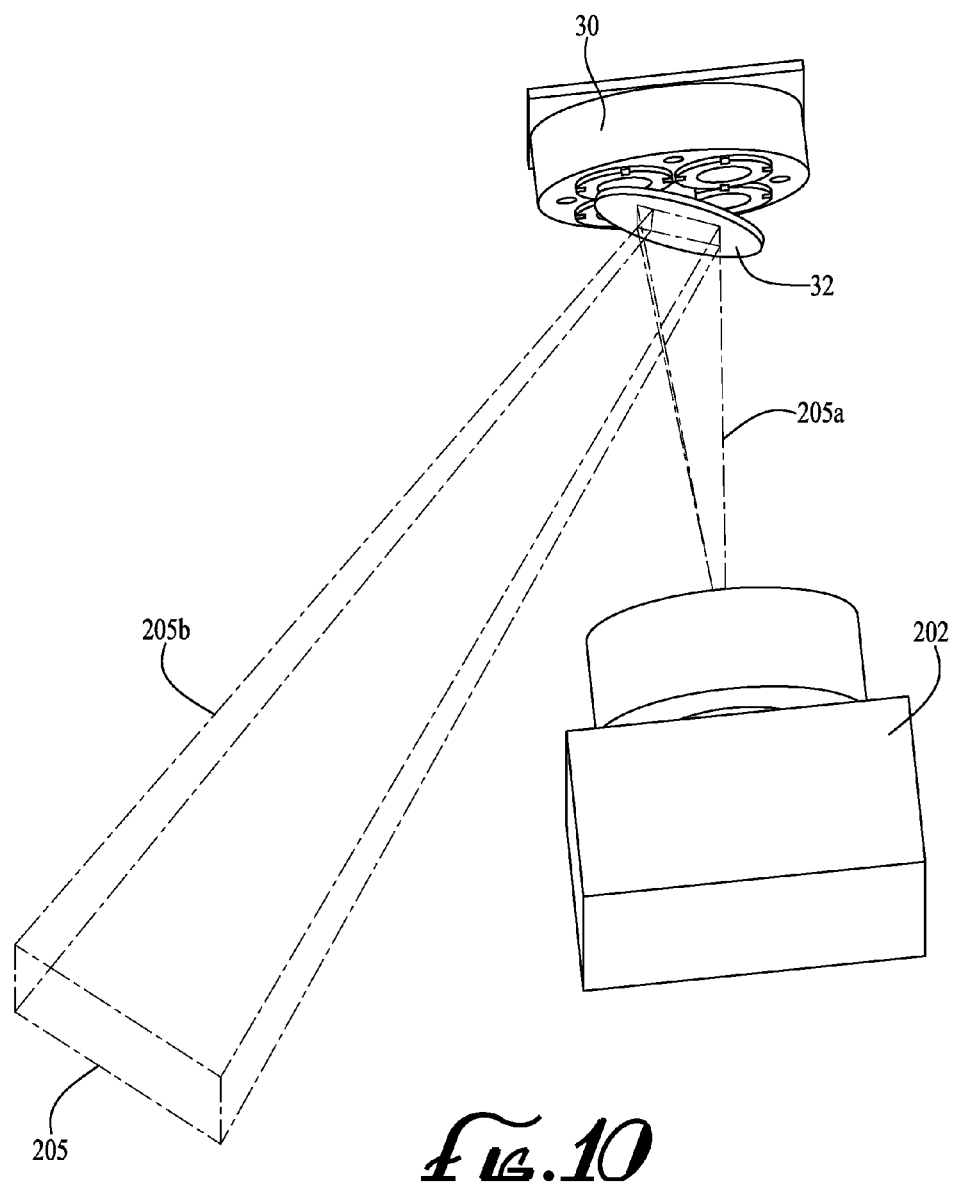

FIGS. 9-10 are schematic views illustrating different arrangements and the operability of the data reader 202 and the fast steering mirror 30. FIG. 9 illustrates the data reader 202 and fast steering mirror 30 aligned relative to one another in a side-by-side configuration, with the data reader 202 projecting a view segment 204a onto the mirror 32, which redirects view segment 204b downwardly (or toward any other direction depending on the position/orientation of the mirror 32) to direct the view volume 204 as desired. FIG. 10 illustrates the data reader 202 with the fast steering mirror 30 positioned above/overhead (i.e., data reader 202 is aimed at normal incidence to the fast steering mirror 30), with the data reader 202 projecting a view segment 204a onto the mirror 32, which redirects view segment 204b sidewardly (or toward any other direction depending on the position/ orientation of the mirror 32) to direct the view volume 204 as desired. In other embodiments, the fast steering mirror 30 and the data reader 202 may be positioned in other arrangements relative to one another.

Preferably, the fast steering mirror 30 is configured to move/deflect at least ±16° in both the X and Y axis in a short period of time (e.g., about 10 ms). Since the optical deflection angle of the view volume is twice the mechanical deflection angle of the fast steering mirror 30, the view volume of the data reader 202 may be directed through a range of at least 64 degrees, or ±32°. For instance, assuming the data reader 202 includes a 1.3 MP global shutter imager and a 35 mm lens, the view volume of the data reader 202 by itself would typically be about 10°×8°. By first directing the view volume onto the movable fast steering mirror 30, the effective view volume of the data reader 202 could be increased to 74°×72°. Thus, any 10°×8° subset of the 74°×72° effective view volume could be imaged at a rate of 30-60 times per second. The entire volume could be imaged once per second, assuming a 60 frame per second camera rate. Depending on the number of different views required, the view sequence can be completed between one and 60 times per second.

In some embodiments, as described in further detail below, the data reader 202 may include a fixed focus lens or a variable focus system that can adjust focus within about 20 ms. With pulsed illumination (e.g., LED, VCSEL, or other illumination sources) surrounding the lens aperture (such as a ring light), the exposure time of the data reader 202 can be quite short, such as 250 μs. In some embodiments, the combination of a global shutter imager, variable focus lens system, fast steering mirror, and pulsed illumination allows the automated checkout system 10 to image a 10°×8° view volume at a frame rate of 30-60 frames per second.

FIG. 11 illustrates a simplified schematic view of the portal scanner 200 installed in a checkstand 8. With reference to FIG. 11, the portal scanner 200 includes a generally inverted U-shaped arch having a top section 206 connected to first and second leg sections 208, 210 respectively. The top section 206 supports a housing structure 212 that houses the data reader 202 and the fast steering mirror (such as the fast steering mirror 30 shown in FIG. 5) positioned above the data reader 202 (i.e., aimed at normal incidence—see FIG. 9). The housing structure 212 preferably has a small profile so as to avoid interfering with items 20 as they cross underneath the scanner 200. In some embodiments, the housing structure 212 has a height $H_{212}$ of approximately 4-5 inches and a width $W_{212}$ of approximately 3-4 inches. In other embodiments, the housing structure 212 may have different suitable dimensions as desired. As is further described with particular reference to FIGS. 26 and 27, the housing structure 212 includes scan window segments 214, 216 that may have corrective lens portions to help address optics issues (e.g., focus) of the data reader 202.

The leg sections 208, 210 may extend generally downwardly (e.g., orthogonally or slanted at an angle) from opposite ends of the top section 206 to create the inverted U-shaped arch of the portal scanner 200. Preferably, the leg sections 208, 210 have identical configurations and are interchangeable to simplify manufacturing, assembly, and replacement if necessary. Accordingly, the following description may describe components for one or the other of the leg sections 208, 210 with the understanding that the description applies to both leg sections 208, 210 unless otherwise indicated. Identical configurations also allow for the scanner 200 to be disassembled and stacked in a more compact package thus saving on shipping, staging, and storage costs.

Each leg section 208, 210 has a lower base mount 218, 219, respectively, that houses a plurality of mirrors 220, 222, 224 arranged at various angles to allow the data reader 202 to read the various surfaces of the item 20. The lower base mounts 218, 219 also serve as a mounting platform for attaching the scanner 200 to the checkstand 8 or other structure supporting the conveyor 12. The dimensions of the lower base mounts 218, 219 may depend on various factors, such as the dimensions of the counter structure 8, the optical features of the data reader 202, the characteristics of the fast steering mirror 30, and the size and orientation of the mirrors 220, 222, 224. Preferably, the lower base mounts 218, 219 have identical dimensions and features, but in other embodiments, the lower base mounts 218, 219 may be different from one another. In one embodiment, the lower base mounts 218, 219 may each be constructed with a height $H_{218}$ ranging from between 8 to 12 inches (preferably between 9.5 and 10 inches), a depth $D_{218}$ ranging between 3 to 5 inches (preferably between 4 and 4.5 inches) to provide sufficient space for mirrors 220, 222, 224 while also maintaining a lean profile, and a width $W_{219}$ ranging from 10 to 12 inches (preferably between 10.5 and 11 inches).

The following section describes an example scanning process for items 20 using the data reader 202 and the fast steering mirror 30. FIGS. 12-15 are simplified schematic views of the automated checkout system 10, with the top section 206 and the leg sections 208, 210 of the scanner 200 removed for simplicity. Also removed are the data reader 202 and all components, except the mirror 32 of the fast steering mirror 30, to avoid obscuring details of the scanning process.

Figure 12:
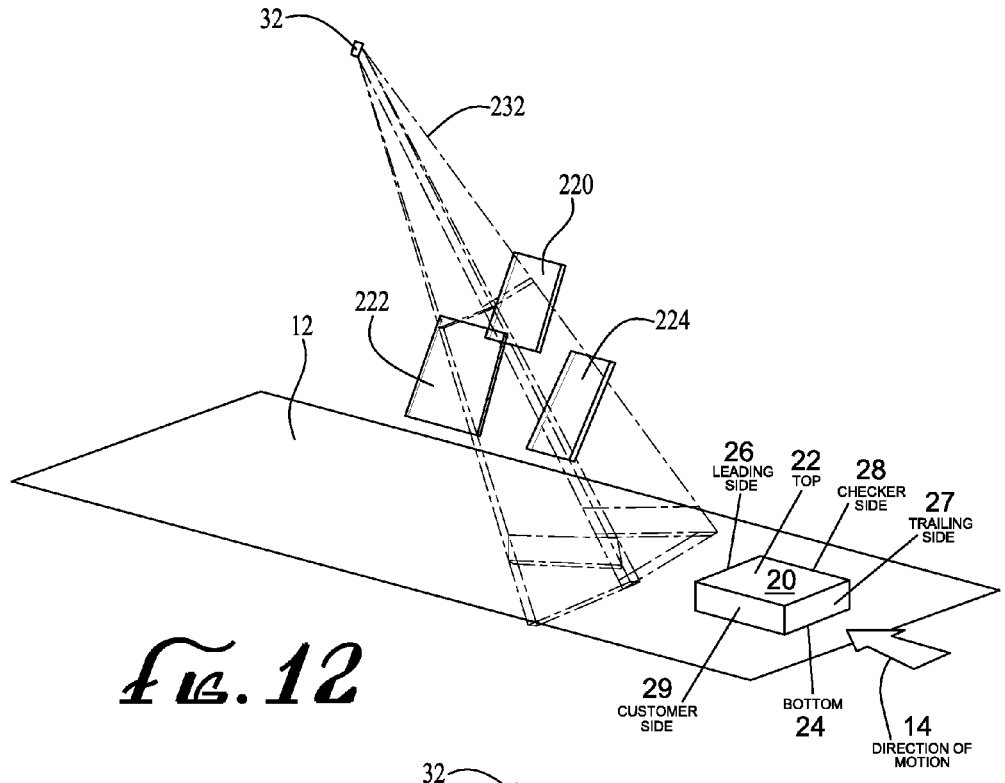
Figure 13:
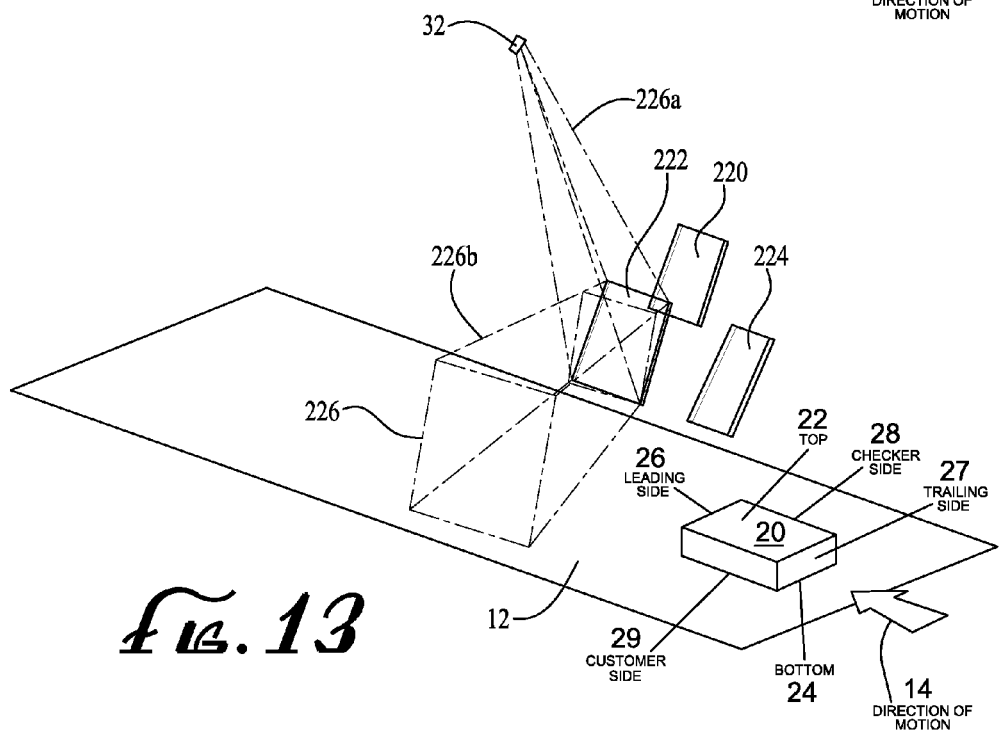

With general reference to FIGS. 11-15, in a typical operation, an item 20 is placed on the conveyor 12 and is moved toward the scanner 200 in the direction of motion 14. As the item 20 approaches the scanner 200, the fast steering mirror 30 is moved to redirect the view volume 232 of the data reader 202 forwardly relative to the scanner 200 toward the oncoming item 20 as illustrated in FIG. 12. In this configuration, the view volume 232 of the data reader 202 is aimed to capture one or more images of the barcode or other data from the top surface 22 and from the leading side 26 of the item 20. Similarly, the view volume 232 of the data reader 202 can be aimed rearwardly of the scanner 200 to capture one or more images of the barcode on the top surface 22 and on the trailing side 27 as the item 20 passes through and exits the scanner 200.

To capture views of the checker side 28 and customer side 29 of the item 20, the fast steering mirror 30 is movable to redirect the view volume 232 of the data reader 202 toward one or more of the mirrors 220, 222, 224 supported by the lower base mounts 218, 219 of the leg sections 208, 210. For instance, with reference to FIG. 13, the fast steering mirror 30 is moved so that the mirror 32 directs view segment 226a toward mirror 222, which redirects view segment 226b sidewardly and slightly forwardly to capture an image of the checker side 28 (and in some instances may also capture an image of the leading side 26) as the item 20 passes through the view segment 226b. With reference to FIG. 14, the fast steering mirror 30 is then moved to another position to direct the view segment 228a of the data reader 202 toward mirror 224, which redirects view segment 228b sidewardly and slightly rearwardly to capture additional images of the checker side 28 (and in some instances may also capture an image of the trailing side 27) as the item 20 passes through the view segment 228*b*.

In some instances, such as for large items 20, the barcode or other target data may be located on an upper portion of the items' checker side 28 near the top surface 22. In such instances, the view volumes 226, 228 directed off the mirrors 222, 224, respectively, may not be sufficiently high enough (e.g., the barcode or other target data may be on the item 20 at a plane above that of the view volumes 226, 228) to capture the barcode or other target data on the checker side 28. To augment the effective view volume of the data reader 202, the lower base mounts 218, 219 may include a mirror 220 mounted at an elevated position relative to the mirrors 222, 224 to produce a view volume 230 higher than the view volumes 226, 228 (see FIG. 15). With reference to FIG. 15, the mirror 32 directs view segment 230*a* toward mirror 220, which redirects view segment 230*b* sidewardly (and may or may not be skewed forwardly or backwardly) to capture an image of the items' checker side 28 as the item 20 passes through the view segment 230*b*.

Preferably, a portion of view volume 230 overlaps with a portion of each of the view volumes 226, 228 so that the image captured by the view volume 230 also partially overlaps with the images captured by the view volumes 226, 228. In cases where the barcode on the checker side 28 straddles between the view volume 230 and the view volumes 226, 228, the respective images from each the view volumes 226, 228, 230 may only capture a portion of the barcode. In some instances, the images captured by each of the view volumes 226, 228, 230 may be stitched together to recreate the entire barcode. After the images are stitched together, the recreated barcode may be processed and decoded. In other instances, the images with fragments of the barcode may be individually processed and the decoded barcode fragments may thereafter be stitched together to recreate the entire barcode.

Similar data reading performance may occur on the opposite leg section 210 to direct the view volumes of the data reader 202 toward a symmetric set of mirrors in the leg section 210 to capture one or more images of the customer side 29, and additional images of the leading and trailing sides 26, 27 of the item 20. To avoid repetition, additional details regarding the leg section 210 will not be further discussed.

The fast steering mirror 30 (or 80) may be operated according to various control schemes. For example, in some embodiments, the fast steering mirror 30 may have a set progression of precise positions/movements to timely direct the view volumes 226, 228, 230, 232 of the data reader 202 as needed based on the position of the item 20. The fast steering mirror 30 may default to a first position where the view volume 232 is directed forwardly of the scanner as illustrated in FIG. 12. After capturing an image of the top surface 22 and/or the leading surface 26, the mirror 32 may move to a second position to direct the view volume 226 toward the mirror 222 of leg section 208, then to a third position to direct the view volume 228 toward mirror 224, then to a fourth position to direct the view volume 230 toward mirror 220 to capture images of the checker side surface 28 (and then follow a similar progression for the mirrors in the opposite leg section 210 to capture images of the customer side 29), and finally move to a last position to the direct the view volume (not shown) rearwardly to capture images of the trailing side 27.

As described previously, the fast steering mirror 30 may cycle through each of these positions rapidly (e.g., on the order of 10 ms) and the exposure time for capturing an image may be approximately 250 μs. Assuming a camera frame rate of 30 frames per second, the fast steering mirror 30 allows the data reader 202 to capture a complete sequence of eight views at a rate of 3.75 complete capture sequences per second. In some instances, these views may correspond to a single item 20 or to many different items 20 at different locations on the conveyor 12. In other embodiments, the fast steering mirror 30 may instead rotate continuously through the various positions (e.g., without stopping at each consecutive position). In other embodiments, images of the bottom surface 24 may be captured via other means to provide a complete set of images including all surfaces of the item 20. For instance, a bottom data reader may be positioned under the conveyor 12 and configured to read through a gap between the conveyor 12. Additional details and example embodiments of such a configuration are described in U.S. Pat. Pub. No. 2012/0187195, the disclosure of which is incorporated by reference herein.

In other embodiments, the checkstand or counter structure 8 may include a sensor 234 near or next to the conveyor 12 for tracking a position of the item 20 as it moves toward the scanner 200 on the conveyor 12 (see FIG. 11). When the sensor 234 is triggered by the presence of the item 20, the sensor 234 may send a signal to the fast steering mirror 30. In response to receiving the signal, the fast steering mirror 30 may initiate and cycle through a preset progression to capture the various images of the item 20. The timing of the step-wise progression of the fast steering mirror 30 may be based on the position of the sensor 234 relative the scanner 200 and a known, typically constant, speed of the conveyors 12 (e.g., 300 mm/s) to anticipate the position of the item 20 after initial detection by the sensor 234. In some embodiments, the counter structure 8 may include a laser rangefinder (not shown) and/or multiple sensors 234 spaced out at various locations on the counter structure 8 to accurately track size, shape, and movement of the item 20 on the conveyor 12 and ensure that the fast steering mirror 30 properly directs the view volume of the data reader 202 based on the tracked position of the item 20. The rangefinder and/or sensors 234 may allow the data reader 202 to accurately process a denser quantity of items 20 than can be accomplished with a predetermined sequence of views. The sensor 234 may also send a signal to the data reader 202 to toggle the data reader 202 between and on/off or on/sleep states, which may aid in conserving power of the data reader 202. In such embodiments, the data reader 202 may be controlled to be selectively powered on only when the sensor 234 is triggered.

When the sensor 234 is initially activated by the item 20, the fast steering mirror 30 may move to direct the view volume 232 of the data reader 202 forwardly to read a top side 22 (and sometimes the leading side 26) of the incoming item 20 (as described with reference to FIG. 12). As the item 20 continues traveling toward the scanner 200 on the conveyor 12, the fast steering mirror 30 may cycle (e.g., in a step-wise fashion) through its various set points to direct the view volumes of the data reader 202 toward the mirrors 220, 222, 224 in the leg sections 208, 210 as described previously.

In the embodiment illustrated in FIGS. 12-15, the combination of the data reader 202 and fast steering mirror 30 provides the data reader 202 with a 360° collective view laterally around the item 20 viewing the top side 22, leading side 26, trailing side 27, checker side 28, and customer side 29. Preferably, the view volumes projected from the data reader 202 are offset from the mirror 32 by approximately 30° relative to normal to avoid the data reader 202 from capturing images of itself in the view volume and/or to avoid glare associated with any lighting components of the data reader 202. The embodiment illustrated in FIGS. 12-15 allows the scanner 200 to use a single data reader 202 for capturing a 360° collective view of the item 20.

In other embodiments, the top arch section 206 and/or the leg sections 208, 210 of the scanner 200 may be omitted, and the fast steering mirror 30 and the data reader 202 may instead be mounted onto the ceiling or onto rails positioned above the counter 8. In such embodiments, the fast steering mirror 30 may redirect the field of view of the data reader 202 downwardly toward the item 20 in a similar fashion as described previously with reference to FIGS. 11-15.

Figure 16:
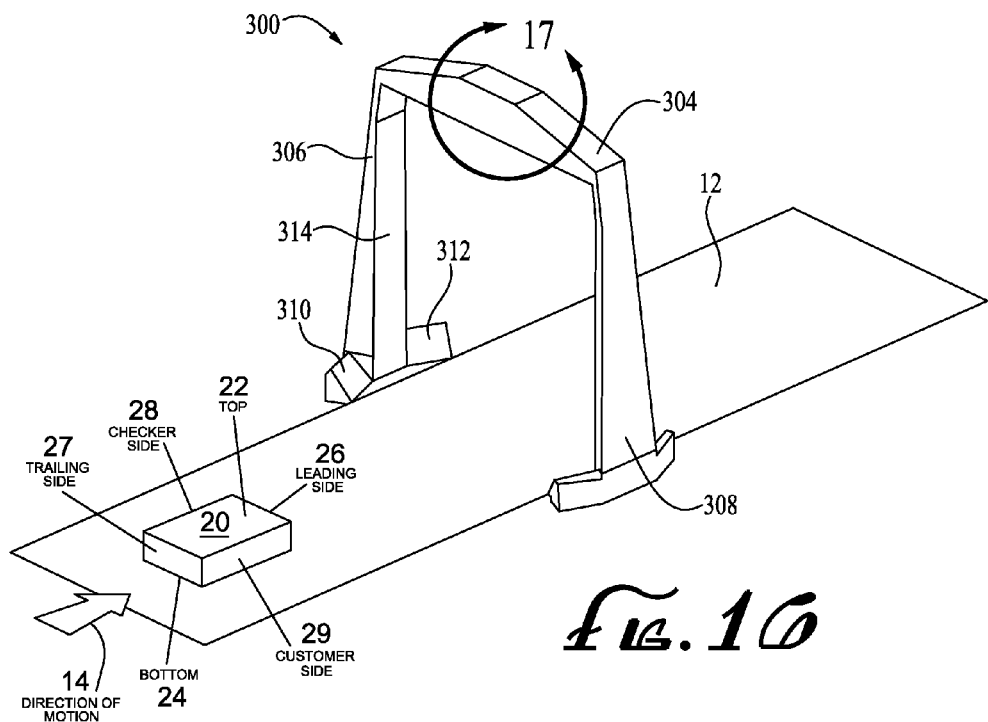
FIG. 16 is a simplified schematic view of a portal scanner with a dual-camera system for generating multiple image views of an item transported through the scanner, according to another embodiment.
Figure 17:
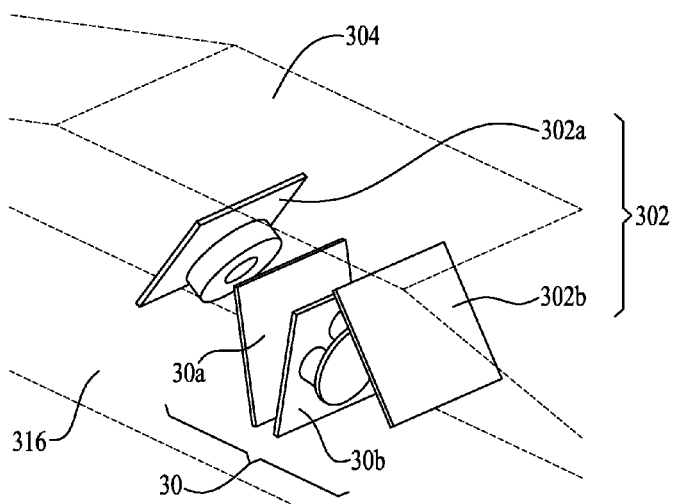
FIG. 17 is a close-up view of a top section of the portal scanner of FIG. 16 illustrating an arrangement of the dual-camera system in the portal scanner.
Figure 20:
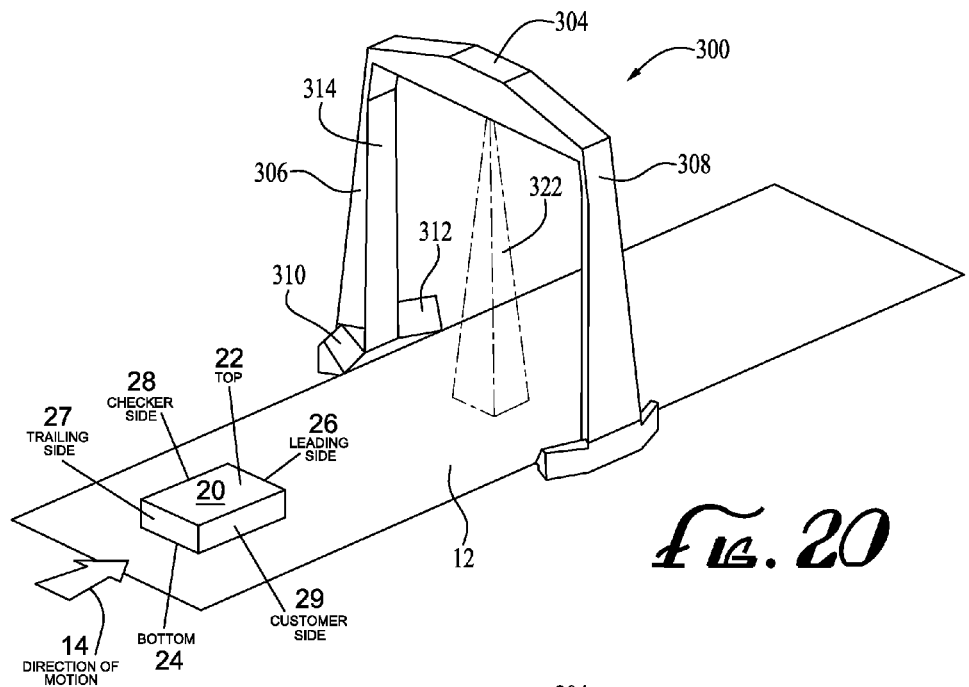

FIGS. 16-24 illustrate another embodiment of the automated checkout system 10 with a pair of data readers 302 and fast steering mirrors 30. Similar to the scanner 200 illustrated in FIGS. 11-15, the scanner 300 includes a generally inverted U-shaped arch having a top section 304 connected to left and right lateral leg sections 306, 308 respectively. The top section 304 houses two pairs of data readers 302a, 302b and fast steering mirrors 30a, 30b therein in a side-by-side configuration as illustrated in FIG. 17. The top section 304 further includes a scan window 316 (see FIG. 17) spanning at least a portion of the underside of the top section 304 through which the data readers 302 project theft respective view volumes for reading data from the item 20.

With particular reference to FIG. 16, the leg sections 306, 308 extend generally downwardly (e.g., orthogonally or slanted at an angle) from opposite ends of the top section 304 to create the inverted U-shaped arch of the portal scanner 300. Each leg section 306, 308 includes a plurality of mirrors 310, 312, 314 arranged at various angles to redirect the view volumes and allow the data readers 302 to read the various surfaces of the item 20. Preferably, the leg sections 306, 308 have identical configurations and are interchangeable to simplify manufacturing, assembly, and replacement if necessary. Accordingly, the following description may describe components or example configurations for one or the other of the leg sections 306, 308 with the understanding that the description applies to both leg sections 306, 308 unless otherwise indicated.

As shown in FIG. 16, the leg sections 306, 308 may include two lower side mirrors 310, 312 arranged on opposite sides of a large mirror 314, which may extend down a majority, or all, of the interior surface of each of the leg sections 306, 308. The mirrors 310, 312, 314 operate in conjunction with the data readers 302 and fast steering mirrors 30 to capture various images of the item 20 as it moves along conveyor 20, in a similar fashion as described with respect to the embodiment of FIGS. 11-15. The following section describes an example operation of the scanner 300 along with additional details of the components of the scanner 300.

With particular reference to FIG. 18, as an item 20 on the conveyor 12 is moved toward the scanner 300 in the direction of motion 14 and approaches the scanner 300, one or both of the fast steering mirrors 30a, 30b are moved to redirect the view volume 318 of the data reader(s) 302a, 302b forwardly relative to the scanner 300 toward the oncoming item 20. The view volume 318 is aimed to capture one or more images of the barcode or other data from the top surface 22 and from the leading side 26 of the item 20. Similarly, with reference to FIG. 20 the view volume 322 may be aimed directly downward from the scanner 300 to capture a top-down view of the top surface 22 (see FIG. 20), and the view volume 320 may be aimed rearwardly of the scanner 300 to capture one or more images of the barcode on the trailing side 27 as the item 20 passes through and exits the scanner 300 (see FIG. 19).

In some embodiments, the images captured by each of the data readers 302a, 302b of the top surface 22, leading side 26, and trailing side 27 may be processed and compared to one another to verify the accuracy of the captured data (i.e., both data readers 302a, 302b should capture similar images and the processed barcode should match). In some instances, one or both of the data readers 302 may capture an image with only a partial barcode (e.g., the item 20 may be angled or irregularly shaped). The partial barcode from each of the images may be stitched together to attempt to form a complete barcode segment for decoding/processing. In other instances, the images with fragments of the barcode may be individually processed and the decoded barcode fragments may thereafter be stitched together to recreate the entire barcode.

Figure 21:
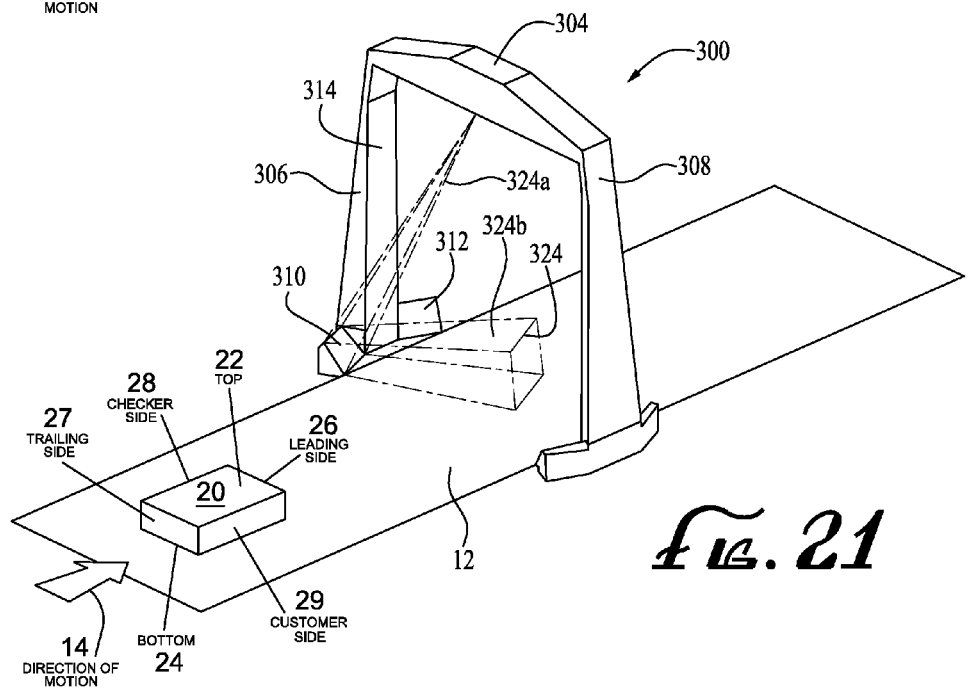
Figure 22:
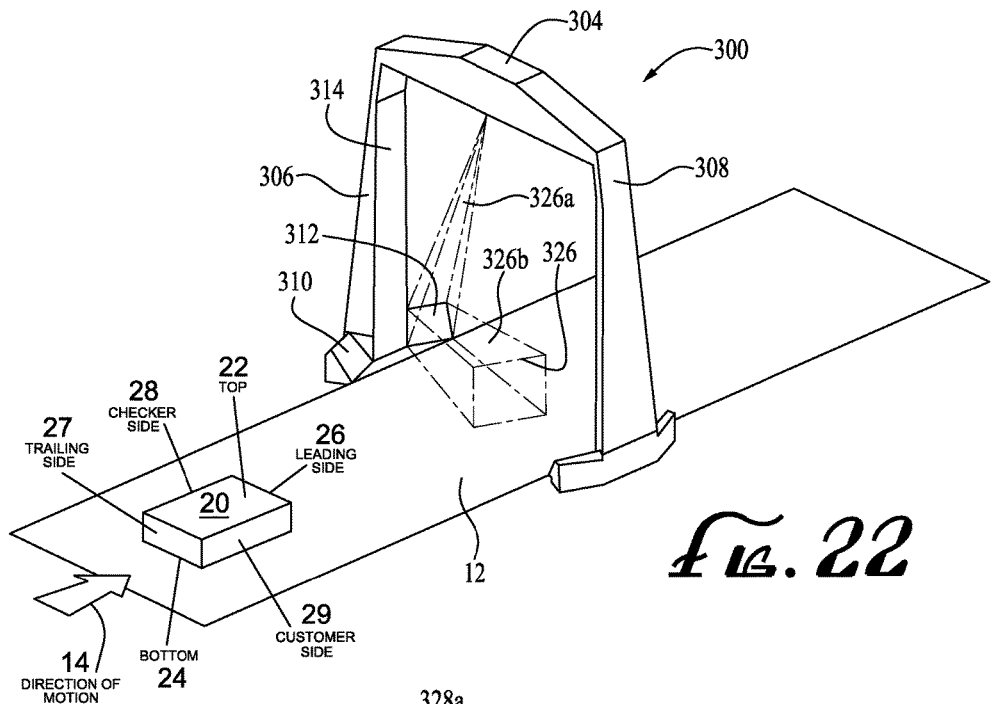
Figure 23:
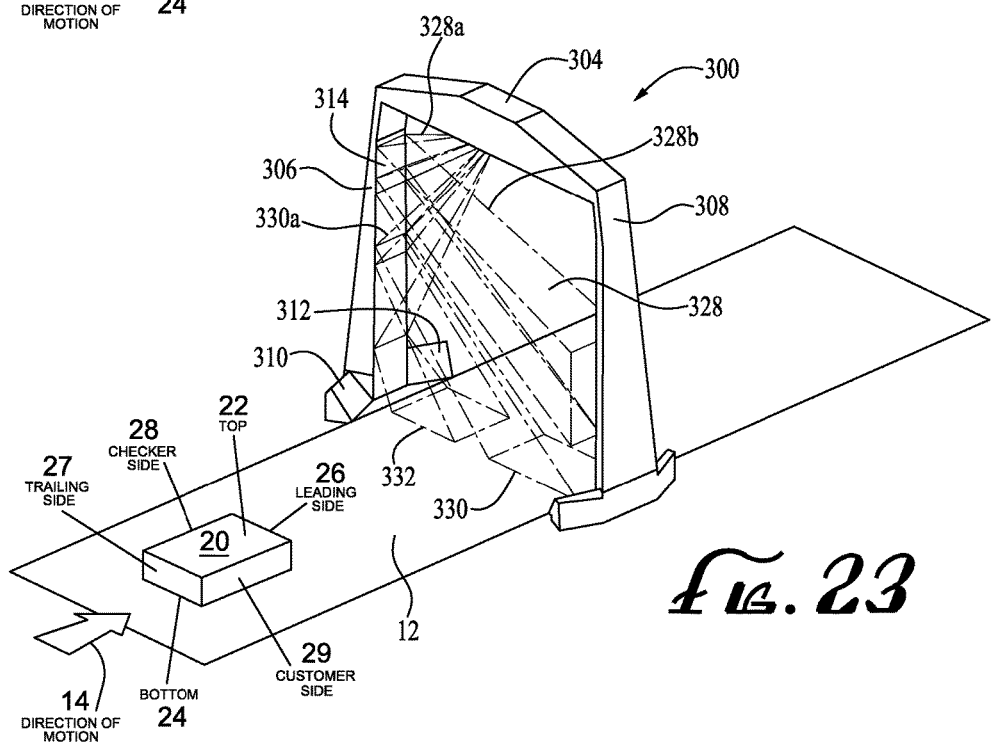

With reference to FIGS. 21-23, to capture views of the checker side 28 and customer side 29 of the item 20, the fast steering mirror 30 can be moved to redirect the view volumes of the data readers 302 toward the mirrors 310, 312, 314 positioned in the leg sections 306, 308. For instance, with particular reference to FIGS. 17 and 21-22, the fast steering mirror 30a may direct view segment 324a of data reader 302a toward mirror 310, which directs view segment 324b sidewardly and slightly rearwardly to capture an image of the checker side 28 (and in some instances may also capture an image of the trailing side 27) as the item 20 passes (see FIG. 21). The fast steering mirror 30a thereafter moves to another position to redirect the view segment 326a of the data reader 302a toward mirror 312, which directs view segment 326b sidewardly and slightly forwardly to capture additional images of the checker side 28 (and in some instances may also capture an image of the leading side 26) as the item 20 passes through the view segment 326b (see FIG. 22). Preferably, the two view volumes 324, 326 have partially overlapping coverage relative to one another to avoid blind spots.

In some instances, such as for large items 20, the barcode or other target data may be located on an upper portion of the checker side 28 near the top surface 22. In such instances, the view volumes 324, 326 directed off the mirrors 310, 312 may not be sufficiently high enough (e.g., the barcode or other target data may be on a plane above that of the view volumes 324, 326) to capture the barcode on the checker side 28. To augment the effective view volume of the data readers 302, the leg sections 306, 308 include the long mirror 314, which may extend through a substantial portion (e.g., more than half) of the height of the leg sections 306, 308. The long mirror 314 may be used to direct multiple view volumes 328, 330, 332 of the data readers 302 to various points on the conveyor 12.

Preferably, at least one view volume (e.g., view volume 328) is redirected toward the conveyor 12 at a higher reading plane above that of the view volumes 324, 326. For instance, with reference to FIG. 23, the fast steering mirror 30a directs view segment 328a toward an upper portion of the long mirror 314, which directs view segment 328 sidewardly (and may or may not be skewed forwardly or backwardly) to capture an image of the checker side 28 as the item 20 passes. As described previously, at least a portion of the view volume 328 has a reading plane above that of the view volumes 324, 326.

Similar to the embodiment described with reference to FIGS. 11-15, view volume 328 partially overlaps with the view volumes 324, 326 so that a portion of the image captured by the view volume 328 overlaps with the images captured by the view volumes 324, 326. This overlapping configuration may advantageously capture a barcode on the checker side 28 that straddles between the view volume 328 and the view volumes 324, 326. In such instances, the barcode may be recreated using an image stitching process and decoded as described previously.

In addition, the long mirror 314 of the leg section 310 may direct a second view volume 330 that may reach farther across the width of the conveyor 12 than the view volumes 324, 326. For instance, the fast steering mirror 30a directs view segment 330a toward a central or middle portion of the long mirror 314, which redirects view segment 330 sidewardly (and may or may not be skewed forwardly or backwardly) to capture an image of the checker side 28 as the item 20 passes. Preferably, the view volume 330 extends across a middle axis of the conveyor 12 to capture an image of the item 20 when the item 20 is adjacent the opposite leg section 308. In some embodiments, the long mirror 314 may also direct a third view volume 332 to read items 20 that are near or close to the leg section 310. As described previously, one or more of the images captured by the view volumes 328, 330, 332 may be stitched and/or compared with images captured from other view volumes 318, 320, 322, 324, 326 to assess the accuracy and reliability of the scanner 300.

Figure 24:
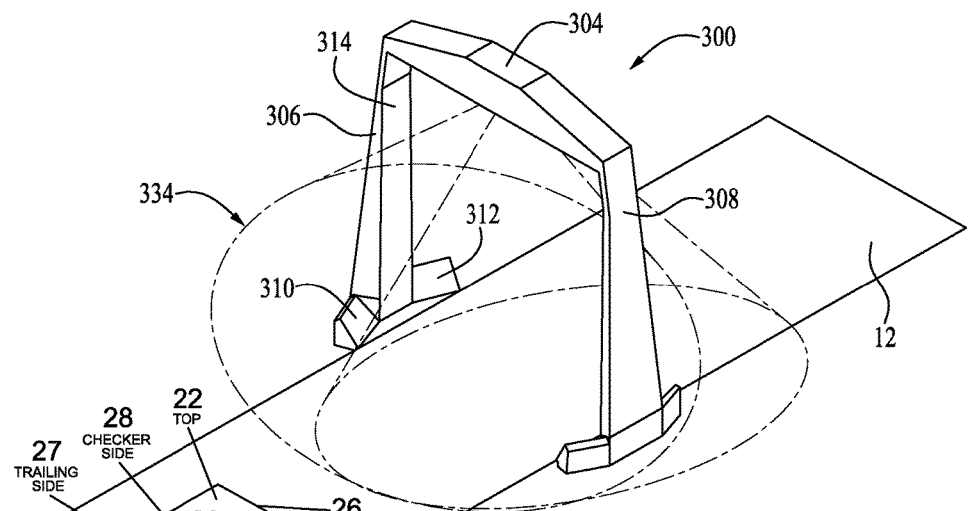
FIG. 24 is a schematic view illustrating a collective field of view of the dual-camera system of FIG. 17.

Although not explicitly described, it should be understood that similar data reading performance may occur on the opposite leg section 308 using the fast steering mirror 30b to direct the view volumes of the data reader 302b toward a symmetric set of mirrors in the leg section 308. The data reader 302b captures images of the barcode on the customer side 29, and additional images of the leading and trailing sides 26, 27. As illustrated in FIG. 24, the combined view volume 334 of the two data readers 302a, 302b provide the scanner 300 with the ability to capture a number of views of the item 20 regardless of its position on the conveyor 12.

As illustrated in FIG. 17, the scanner 300 includes a pair of fast steering mirrors 30a, 30b aligned in a side-by-side configuration with a pair of data readers 302a, 302b. This alignment eliminates the need for a separate housing (e.g., housing structure 212 on the top section 206 of the scanner 200) for the data readers 302 and fast steering mirrors 30. In some instances, it may be advantageous to use two sets of data readers 302a, 302b and fast steering mirrors 30a, 30b to capture multiple image perspectives of the item 20 as it passes through the scanner 300.

Turning back to FIG. 17, when the first fast steering mirror 30a is aligned next to the data reader 302a, the first fast steering mirror 30a redirects the view volume of the data reader 302a toward the leg section 306. Similarly, the second fast steering mirror 30b redirects the view volume of the data reader 302b toward the leg section 308. Essentially, the side-by-side alignment limits the coverage of the data readers 302 to approximately one-half of the conveyor 12 surface, where each data reader 302 views either the checker side 28 or the customer side 29 of the item 20. Accordingly, using two pairs of data readers 302 and fast steering mirrors 30 may be needed to obtain image perspectives for both sides of the item 20. Additionally, the arrangement of FIG. 17 allows the field of view of each data reader 302 to be unobstructed by glare or viewing itself over a wide range, as shown in FIG. 24.

Figure 25:
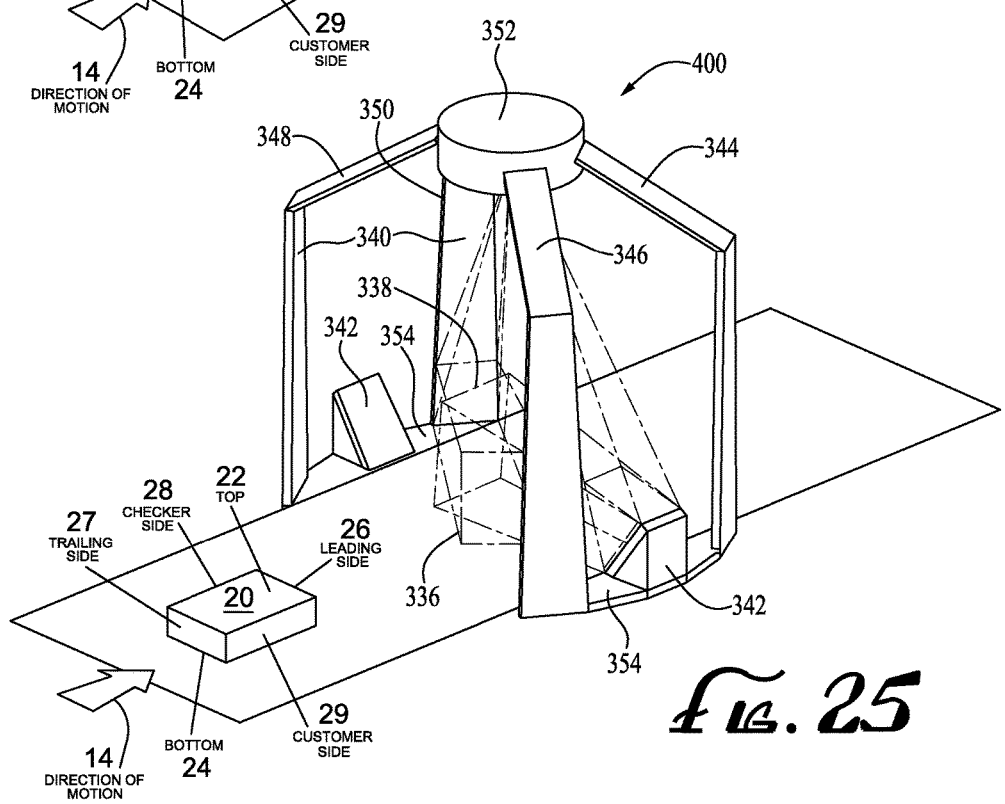
FIG. 25 is a simplified schematic view of a portal scanner with a camera system for generating multiple image views of an item transported through the scanner, according to another embodiment.

FIG. 25 illustrates another embodiment of the scanner 400 that may have a larger profile than the scanners 200, 300 described previously and an open architecture. The scanner 400 may include a single data reader/fast steering mirror pair (not shown) similar to the scanner 200 or may include two sets of data readers and fast steering mirrors similar to the scanner 300. The data readers and fast steering mirrors may be housed in a central base 352 and operate in a similar fashion as in previous embodiments. For example, the view volumes 336, 338 may be redirected off long mirrors 340 or lower mirrors 342 to obtain various image perspectives of the item 20 as it passes through the scanner 400. The long mirrors 340 may be mounted or formed on leg sections 344, 346, 348, 350 that radiate outwardly from the central base 352. Alternatively, the lower mirrors 342 may be supported or mounted on a base mount 354 and positioned between a pair of leg sections (e.g., 344, 346) on each side of the scanner 400. The scanner 400 may be mounted/attached to a checkstand or other counter structure via the base mount 354.

Aside from the different configuration of the mirrors 340, 342 and the leg sections 344, 346, 348, 350, the scanner 400 may operate in a substantially similar manner as described previously with respect to the scanners 200, 300. For example, as described previously, the fast steering mirror may cycle or move through a set of progressions or angular positions to allow the data reader to obtain images of the various surfaces of the item 20. Accordingly, to avoid repetition, additional detail relating to the embodiment illustrated in FIG. 25 will not be further described.

Preferably, as mentioned previously, the data readers 202, 302 described in the various embodiments relating to scanners 200, 300, 400 may include a variable focus lens system. The variable focus lens system may be advantageous since the data readers 202, 302 may require different focal distances to capture images from various zones of the automated checkout system 10. The variable focus lens system would be able to configure the necessary focus to capture focused images, based on predetermined focus ranges, or by measured distances from the data reader 202 to the items 20, or based on data from the sensor 234, or by other suitable means.

Figure 27:
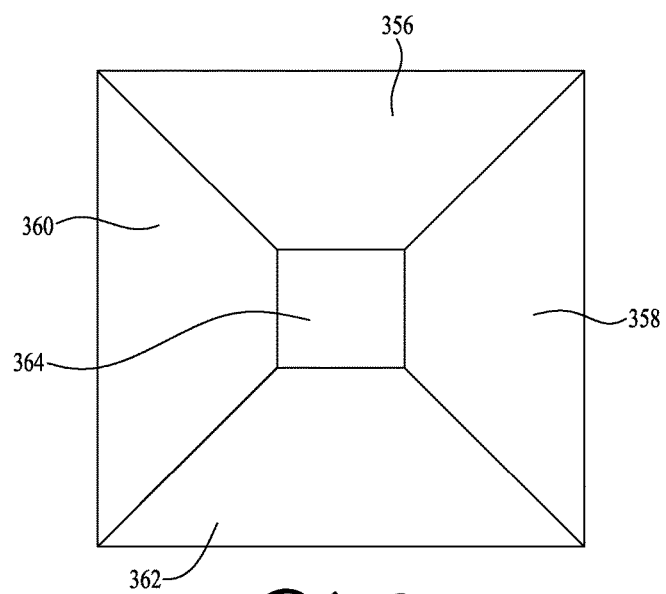
FIG. 27 is a schematic illustrating various reading zones for the portal scanner of FIG. 11.

FIG. 27 illustrates a schematic top elevation view of four general reading zones 356, 358, 360, 362 of the data reader 202 of FIG. 11. To establish a frame of reference, the zone 356 may correspond to a trailing view of the item 20, the zones 358, 360 may correspond to checker and customer views, respectively, and the zone 362 may correspond to a leading view of the item 20. As the item 20 approaches the scanner 200, the item 20 passes first through zone 362, followed by zones 358, 360, and exits through zone 356. Since each of the zones may be at a different distance and angle from the data reader 202, each of the zones 356, 358, 360, 362 may require a different focal distance for the data reader 202 to capture focused images of the item 20. In the embodiment of FIG. 11, the data reader 202 may include a dead zone 364 generally centered directly beneath the data reader 202. In the dead zone 364, the data reader 202 has difficulty or is unable to read any data from the item 20 because the data reader 202 itself obscures the view that would be reflected off the fast steering mirror (i.e., the view would be directed off the mirror back into the data reader 202, or onto the body or other physical features of the data reader 202). It should be understood that in other embodiments, one or more data readers 202 may be arranged differently to eliminate or reduce the size of the dead zone, such as in the embodiment illustrated in FIG. 17.

As mentioned previously, a variable focus lens is operable to change focal distances as needed to capture images from each of the various zones 356, 358, 360, 362. But, data readers with variable focus lens systems may be more expensive and sometimes slower than data readers with a fixed focus lens system. However, one disadvantage of using a fixed focus lens system is that the data reader may have difficulty acquiring properly focused images from each of the zones 356, 358, 360, 362 because of its fixed focal distance. The following section describes one embodiment of a data reader with a fixed focus lens system that may be used to address these disadvantages.

Figure 26:
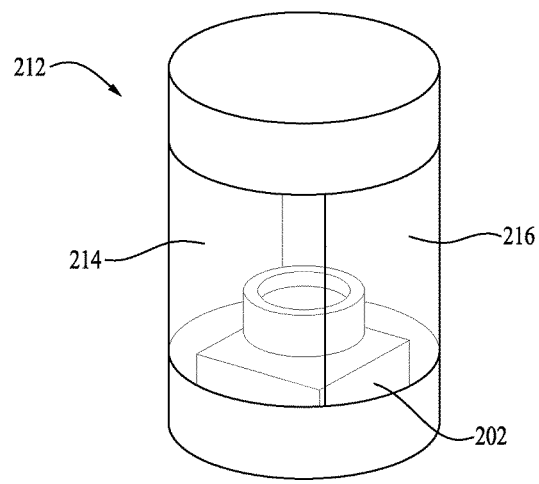
FIG. 26 illustrates a housing structure for the camera system of the portal scanner of FIG. 11, with corrective lens elements for a fixed focus camera system.

As illustrated in FIG. 25, the zones 356, 358, 360, 362 are generally distinct and spatially separated from one another. Accordingly, one embodiment may include corrective optics strategically positioned to intercept an incoming image of the item 20 from each of the zones 356, 358, 360, 362 and correct the image. FIG. 26 illustrates a close-up view of the housing structure 212 of the scanner 200 (see FIG. 11). With particular reference to FIG. 26, the scan window segments 214, 216 of the housing structure 212 may include corrective lenses with various curvatures (similar in principle to a bifocal or progressive lens). The corrective lenses may be included as part of the window segments 214, 216 or could be made in several sections attached to the window segments 214, 216. In one example operation, the data reader 202 may have its view volume focused on zone 360 to obtain an image of the customer side 29 of the item 20. The image of the customer side 29 is captured and directed back through the window segment 214, where it is properly focused by the corrective lenses. A similar process may occur for each of the four zones 356, 358, 360, 362. In this configuration, the use of corrective lenses to properly focus the image provides the opportunity to use data readers with a fixed focus lens system to obtain images of the items 20 that may be at various distances from the data reader.

The same or similar arrangement of corrective lenses may be used with the embodiments illustrated in FIGS. 16 and 25. For instance, with reference to FIG. 17, the scan window 316 in the scanner 300 may include various corrective lens segments with different curvatures to properly focus the image depending on the zone 356, 358, 360, 362 from which the image originates. Accordingly, although the more expensive variable focus lens systems may be used with the scanners 200, 300, 400, it may also be possible to adapt the scanners 200, 300, 400 to use the less expensive fixed focus lens system with good results.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated checkout system for reading encoded data from an item, the automated checkout system comprising:
   a portal scanner having a first leg section spaced apart from a second leg section, and a top arch section extending across from the first leg section to the second leg section, wherein the first leg section includes a first plurality of mirrors and the second leg section includes a second plurality of mirrors;
   a steerable mirror supported by the top arch section;
   an imaging system supported by the top arch section, the imaging system having a view volume directed toward the steerable mirror;
   an actuator;
   a controller in operative communication with the actuator and the steerable mirror, the controller storing a plurality of control schemes including a first control scheme and a second control scheme, the controller operable to select between the first and second control schemes, wherein the controller is programmed to drive the actuator and move the steerable mirror through a plurality of positions based on a selected one of the first control scheme or the second control scheme, wherein during the first control scheme, the controller drives the actuator, which in turn, drives the steerable mirror along a first movement pattern through a first plurality of positions, where at each position in the first plurality of positions, the steerable mirror redirects the view volume of the imaging system toward one mirror of the first plurality of mirrors and the second plurality of mirrors, and wherein during the second control scheme, the controller drives the actuator, which in turn, drives the steerable mirror along a second movement pattern through a second plurality of positions, where at each position in the second plurality of positions, the steerable mirror redirects the view volume of the imaging system toward one mirror of the first plurality of mirrors and the second plurality of mirrors;
   wherein the imaging system stitches together a plurality of images from one or more of the plurality of regions to collectively form a read region of the portal scanner for reading an optical code from an item being passed through the read region; and
   a conveying system operable for transporting the item through the read region of the portal scanner.

2. The automated checkout system of claim 1, the portal scanner further comprising:
   a first mirror supported by or adjacent to the first leg section; and
   a second mirror supported by or adjacent to the second leg section,
   wherein the first plurality of positions includes a first position, a second position, a third position, and a fourth position, and wherein the controller drives the actuator, which in turn, drives the steerable mirror from the first position to the second position, from the second position to the third position, and from the third position to the fourth position, the steerable mirror redirecting the view volume toward the first mirror on the first leg section when in the third position, and redirecting the view volume toward the second mirror on the second leg section when in the fourth position.

3. The automated checkout system of claim 2, wherein the controller drives the actuator, which in turn, drives the steerable mirror in a step-wise progression from the first position to the second position, from the second position to the third position, and from the third position to the fourth position.

4. The automated checkout system of claim 3, further comprising:
   a counter structure supporting the portal scanner and the conveying system;
   a sensor configured to sense a presence of the item on the conveying system and to transmit a signal to the steerable mirror in response to sensing the presence of the item on the conveying system, wherein the controller drives the actuator, which in turn, drives the steerable mirror through the step-wise progression in response to the steerable mirror receiving the signal from the sensor.

5. The automated checkout system of claim 1, further comprising a housing structure supported by the top arch section, the housing structure enclosing both the steerable mirror and the imaging system.

6. The automated checkout system of claim 5, wherein the imaging system includes a fixed focus lens system, and wherein the housing structure includes a scan window through which the view volume of the imaging system is directed, the scan window including at least one window segment bearing corrective optics.

7. The automated checkout system of claim 1, wherein the top arch section includes a scan window through which the view volume of the imaging system is directed, the scan window including at least one window segment bearing corrective optics.

8. The automated checkout system of claim 1, the steerable mirror further comprising:
   a chassis;
   a mirror; and
   an elastomeric flexure coupled to the mirror and the chassis, wherein the flexure supports movement of the mirror on two axes.

9. The automated checkout system of claim 1, wherein the first movement pattern of the first control scheme includes a step-wise progression, the controller driving the actuator, which in turn, drives the steerable mirror from a first position to a second position and from the second position to a third position, wherein the actuator rests prior to subsequent movement of the steerable mirror from the first position to the second position, and from the second position to the third position, and wherein the second movement pattern of the second control scheme includes a non-stop, continuous cycling progression, the controller driving the actuator, which in turn, drives the steerable mirror from a fourth position to a fifth position, and from the fifth position to a sixth position, and from the sixth position back to the fourth position.

10. The automated checkout system of claim 1, wherein the imaging system stitches together a plurality of images from one or more of the plurality of regions to collectively form a 360-degree collective view laterally around the item being passed through the read region.

11. The automated checkout system of claim 1, further comprising a sensor configured to obtain a shape and size of the item on the conveying system.

12. The automated checkout system of claim 1, wherein the first plurality of positions includes a default position, and wherein during the first control scheme, the controller drives the actuator from the default position to a first position, from the first position to a second position, from the second position to a third position, and from the third position to the default position.

13. The automated checkout system of claim 12, wherein the during the second control scheme, the controller drives the actuator from the default position to a fourth position, from the fourth position to a fifth position, from the fifth position to a sixth position, and from the sixth position to the default position.

14. An automated checkout system for reading encoded data from an item, the automated checkout system comprising:
   a portal scanner having a first leg section spaced apart from a second leg section, and a top arch section extending across from the first leg section to the second leg section, wherein the first leg section includes a first plurality of mirrors and the second leg section includes a second plurality of mirrors;
   a steerable mirror supported by the top arch section;
   an imaging system including a variable focus lens system, the imaging system supported by the top arch section, the imaging system having a view volume directed toward the steerable mirror
   an actuator;
   a controller in operative communication with the actuator and the steerable mirror, the controllable storing a plurality of control schemes including a first control scheme and a second control scheme, the controller operable to select between the first and second control schemes, wherein the controller is programmed to drive the actuator and move the steerable mirror through a plurality of positions based on a selected one of the first control scheme or the second control scheme, wherein during the first control scheme, the controller drives the actuator, which in turn, drives the steerable mirror along a first movement pattern through a first plurality of positions, where at each position in the first plurality of positions, the steerable mirror redirects the view volume of the imaging system toward one mirror of the plurality of mirrors and the second plurality of mirrors, and wherein during the second control scheme, the controller drives the actuator, which in turn, drives the steerable mirror moves along a second movement pattern through a second plurality of positions, where at each position in the second plurality of positions, the steerable mirror redirects the view volume of the imaging system toward one mirror of the first plurality of mirrors and the second plurality of mirrors;
   wherein the imaging system stitches together a plurality of images from one or more of the plurality of regions to collectively form a read region of the portal scanner for reading an optical code from an item being passed through the read region; and
   a conveying system operable for transporting the item through the read region of the portal scanner.

15. The automated checkout system of claim 14, the portal scanner further comprising:
   a first mirror supported by or adjacent to the first leg section; and
   a second mirror supported by or adjacent to the second leg section,
   wherein the plurality of positions includes a default position, a first position, a second position, a third position, and a fourth position, and wherein the controller drives the actuator, which in turn, drives the steerable mirror from the default position to the first position, from the first position to the second position, from the second position to the third position, from the third position to the fourth position, and from the fourth position to the default position, the steerable mirror redirecting the view volume toward the first mirror on the first leg section when in the third position, and redirecting the view volume toward the second mirror on the second leg section when in the fourth position.

16. The automated checkout system of claim 14, further comprising:
   a sensor configured to sense a location of the item on the conveying system and to transmit a signal to the imaging system in response to sensing the location of the item on the conveying system, wherein the imaging system is further configured to adjust the focus of the variable focus lens system in response to receiving the signal from the sensor.

17. The automated checkout system of claim 14, wherein the first movement pattern of the first control scheme includes a step-wise progression, the actuator driving the steerable mirror from a first position to a second position and from the second position to a third position, wherein the actuator rests prior to subsequent movement from the first position to the second position, and from the second position to the third position, and wherein the second movement pattern of the second control scheme includes a non-stop, continuous cycling progression, the actuator driving the steerable mirror from a fourth position to a fifth position, and from the fifth position to a sixth position, and from the sixth position back to the fourth position.

18. The automated checkout system of claim 14, wherein the imaging system stitches together a plurality of images from one or more of the plurality of regions to collectively form a 360-degree collective view laterally around the item being passed through the read region.

19. The automated checkout system of claim 14, further comprising a sensor configured to obtain a shape and size of the item on the conveying system.

\* \* \* \* \*